United States Patent
Van Der Wiel

(10) Patent No.: US 10,317,297 B2
(45) Date of Patent: Jun. 11, 2019

(54) SEMICONDUCTOR PRESSURE SENSOR

(71) Applicant: MELEXIS TECHNOLOGIES NV, Tessenderlo (BE)

(72) Inventor: Appolonius Jacobus Van Der Wiel, Duisburg (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 14/735,369

(22) Filed: Jun. 10, 2015

(65) Prior Publication Data

US 2015/0311353 A1 Oct. 29, 2015

Related U.S. Application Data

(63) Continuation-in-part of application No. 14/650,505, filed as application No. PCT/EP2014/077230 on Dec. 10, 2014, now Pat. No. 9,689,767.

(30) Foreign Application Priority Data

Dec. 11, 2013 (GB) .................................. 1321867.2

(51) Int. Cl.
*H01L 29/84* (2006.01)
*G01L 1/18* (2006.01)
(Continued)

(52) U.S. Cl.
CPC .............. *G01L 1/18* (2013.01); *G01L 9/0055* (2013.01); *G01L 9/065* (2013.01); *G01L 19/02* (2013.01)

(58) Field of Classification Search
CPC .................................. G01L 9/06; G01L 9/0054
See application file for complete search history.

(56) References Cited

U.S. PATENT DOCUMENTS 336,995 A 3/1886 Fischer
4,065,971 A 1/1978 Shimazoe et al.
(Continued)

FOREIGN PATENT DOCUMENTS

CN 1460846 A 12/2003
CN 1287134 C 11/2006
(Continued)

OTHER PUBLICATIONS

Azhari et al., "AZKA Cell, the Current-Mode Alternative of Wheatstone Bridge", Sep. 2000, IEEE Transactions on Circuits and Systems—Fundamental Theory and Application, vol. 47, No. 9.*
(Continued)

*Primary Examiner* — Harshad R Patel
*Assistant Examiner* — Tran M. Tran
(74) *Attorney, Agent, or Firm* — Workman Nydegger

(57) ABSTRACT

A semiconductor pressure sensor for measuring an external pressure exerted on the sensor, including: a membrane; a first resistor connected between a first bias node and a first output node; a second resistor connected between the first bias node and a second output node; a first and second current source connected to the first resp. second output node for generating a differential voltage signal indicative of the external pressure to be measured. The resistors including piezo-resistive strips arranged in particular crystallographic directions. The circuit may have a third and four resistor pair for compensating package stress. The Piezo-resistive strips may be formed as p-doped regions within an n-well, the biasing node being electrically connected to the n-well.

17 Claims, 10 Drawing Sheets

(51) Int. Cl.
  *G01L 9/00* (2006.01)
  *G01L 9/06* (2006.01)
  *G01L 19/02* (2006.01)

(56) References Cited

U.S. PATENT DOCUMENTS

| | | | |
|---|---|---|---|
| 4,530,244 A | 7/1985 | Starr | |
| 4,672,411 A | 6/1987 | Shimizu et al. | |
| 4,683,755 A | 8/1987 | Samek | |
| 4,777,826 A | 10/1988 | Rud, Jr. et al. | |
| 5,537,882 A * | 7/1996 | Ugai | G01L 9/0054 338/42 |
| 5,589,634 A * | 12/1996 | Nagahara | G01P 15/123 73/514.33 |
| 6,234,027 B1 | 5/2001 | Schatz | |
| 6,422,088 B1 * | 7/2002 | Oba | G01D 3/08 73/754 |
| 6,598,484 B2 * | 7/2003 | Tanizawa | G01D 3/036 73/754 |
| 6,615,668 B2 | 9/2003 | Toyoda et al. | |
| 6,649,988 B2 * | 11/2003 | Toyoda | G01L 9/0054 257/108 |
| 6,718,830 B1 | 4/2004 | Johnson | |
| 6,789,431 B2 | 9/2004 | Ishio | |
| 6,838,303 B2 | 1/2005 | Wang et al. | |
| 6,933,582 B2 * | 8/2005 | Ishio | G01L 9/0054 257/414 |
| 6,973,836 B2 | 12/2005 | Katsumata et al. | |
| 7,010,984 B2 * | 3/2006 | Krog | G01L 13/025 73/716 |
| 7,278,319 B2 * | 10/2007 | Johnson | G01L 9/0054 73/721 |
| 7,387,028 B1 * | 6/2008 | Carver | G01B 5/30 73/715 |
| 7,509,866 B2 | 3/2009 | Krog et al. | |
| 7,540,198 B2 * | 6/2009 | Ichikawa | G01L 9/0054 73/721 |
| 7,597,005 B2 * | 10/2009 | McMonigal | G01L 9/0055 73/756 |
| 7,647,833 B1 * | 1/2010 | Oboodi | G01L 9/0044 73/721 |
| 7,823,456 B2 | 11/2010 | Krog et al. | |
| 8,522,619 B2 | 9/2013 | Tokuda et al. | |
| 8,547,156 B2 * | 10/2013 | Foroudi | H03K 17/687 327/113 |
| 8,561,461 B2 * | 10/2013 | Van Der Wiel | G01F 1/6845 374/31 |
| 8,671,765 B2 * | 3/2014 | Tokuda | G01L 9/0054 73/700 |
| 8,803,262 B2 | 8/2014 | Childress et al. | |
| 9,016,135 B2 | 4/2015 | Huber et al. | |
| 9,105,753 B2 * | 8/2015 | Tanaka | H01L 29/84 |
| 9,134,191 B2 * | 9/2015 | Rahajandraibe | G01L 1/22 |
| 9,157,826 B2 * | 10/2015 | Krishna | G01L 27/002 |
| 9,513,182 B2 * | 12/2016 | Kakoiyama | G01L 9/0052 |
| 9,683,907 B2 * | 6/2017 | Takeuchi | G01L 9/06 |
| 2002/0050172 A1 | 5/2002 | Toyoda et al. | |
| 2002/0053916 A1 | 5/2002 | Tanizawa | |
| 2003/0217603 A1 | 11/2003 | Ishio | |
| 2004/0079159 A1 * | 4/2004 | Muchow | G01L 9/06 73/716 |
| 2004/0173027 A1 | 9/2004 | Katsumata et al. | |
| 2008/0022779 A1 | 1/2008 | Krog et al. | |
| 2009/0120194 A1 * | 5/2009 | Rahn | G01L 9/0054 73/715 |
| 2009/0211362 A1 | 8/2009 | Krog et al. | |
| 2010/0043530 A1 | 2/2010 | Elian et al. | |
| 2011/0247422 A1 | 10/2011 | Tokuda et al. | |
| 2012/0210800 A1 | 8/2012 | Huber et al. | |
| 2013/0181303 A1 | 7/2013 | Childress et al. | |
| 2015/0128713 A1 | 5/2015 | Kakoiyama | |
| 2016/0265999 A1 * | 9/2016 | Van Der Wiel | G01L 9/0055 |

FOREIGN PATENT DOCUMENTS

| | | |
|---|---|---|
| CN | 101034021 A | 9/2007 |
| CN | 101044382 A | 9/2007 |
| CN | 101349602 A | 1/2009 |
| CN | 101526411 A | 9/2009 |
| CN | 102980692 A | 3/2013 |
| CN | 103063339 A | 4/2013 |
| DE | 19701055 A1 | 7/1998 |
| DE | 102009026676 A1 | 12/2010 |
| EP | 0083496 A2 | 7/1983 |
| EP | 0736756 A1 | 10/1996 |
| GB | 1547592 A | 6/1979 |
| JP | S5217780 A | 2/1977 |
| JP | S53109490 A | 9/1978 |
| JP | S58120142 A | 7/1983 |
| JP | H05248974 A | 9/1993 |
| JP | H06160221 A | 6/1994 |
| JP | H06216398 A | 8/1994 |
| JP | 2002116105 A | 4/2002 |
| JP | 2002131161 A | 5/2002 |
| JP | 2004271315 A | 9/2004 |
| JP | 2009139258 A | 6/2009 |
| JP | 2011220935 A | 11/2011 |
| JP | 2012173287 A | 9/2012 |
| JP | 2013145163 A | 7/2013 |
| JP | 2013152228 A | 8/2013 |
| WO | 96/22515 A1 | 7/1996 |
| WO | 1996022515 A1 | 7/1996 |
| WO | 2001040751 A1 | 6/2001 |

OTHER PUBLICATIONS

Farshidi, "A Low-Voltage Current-Mode Wheatstone Bridge using CMOS Transistors", 2011, International Journal of Electrical and Electronics Engineering.*
Great Britain Search Report for corresponding Great Britain Application No. 1321867.2, dated Sep. 15, 2014.
International Search Report for corresponding International PCT Application No. PCT/EP20141077230, dated Mar. 12, 2015.
Appolonius Jacobus Van Der Wiel, "Flow Measurement Concepts Applied to Silicon Sensors," Institution of Microtechnology University of Neuchatel, Dissertation submitted to Faculty of Science University of Neuchatel, Chapters 1-3, 1994, pp. 1-57.
Appolonius Jacobus Van Der Wiel, "Flow Measurement Concepts Applied to Silicon Sensors," Institution of Microtechnology University of Neuchatel, Dissertation submitted to Faculty of Science University of Neuchatel, Chapters 4 the Calorimetric Flow Sensor, 1994, pp. 59-90.
Extended European Search Report from corresponding EP Application No. 15171268.4, dated Nov. 11, 2015.
Chinese Office Action from CN Application No. CN 201480067354.6, dated Mar. 28, 2018.
Japanese Office Action from JP Application No. JP2017-530286, dated Jun. 5, 2018.
Japanese Office Action from JP Application No. 2016-529427, dated Jul. 31, 2018.
Japanese Search Report from JP Application No. 2016-529427, dated Jul. 20, 2018.
Chinese Office Action from CN Application No. 201580067525.X, dated Jan. 18, 2019.

* cited by examiner

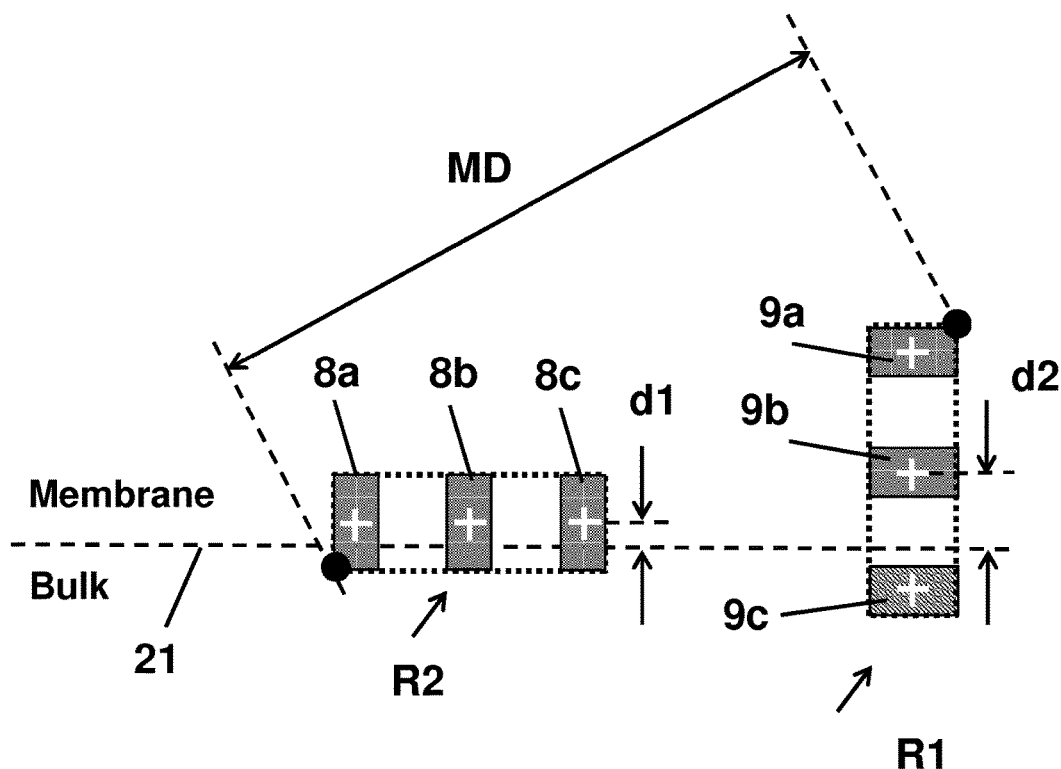
FIG. 11
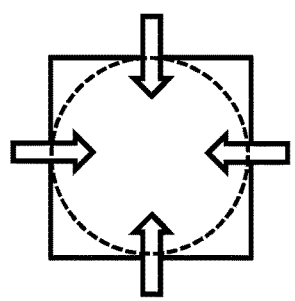      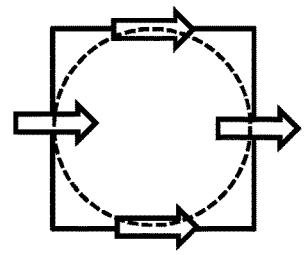
FIG. 12         FIG. 13

SEMICONDUCTOR PRESSURE SENSOR

FIELD OF THE INVENTION

The present invention relates to the field of pressure sensors, in particular pressure sensors integrated in a semiconductor-device.

BACKGROUND OF THE INVENTION

Semiconductor pressure sensors are known in the art.

U.S. Pat. No. 4,672,411 (Hitachi) discloses a pressure sensor (shown in FIG. 1) having a diaphragm formed in a semiconductor body, the diaphragm having a pair of pressure sensing semiconductor strips in a major surface thereof (vertical piezo-resistive strips 30, 31 in FIG. 1). Each of the strips 30, 31 is connected at one end to the other one by a semiconductor region (triangular region 32 in FIG. 1). The semiconductor region 32 is formed in a direction of small piezo-resistive coefficients, while the strips 30, 31 are formed in a direction of large piezo-resistive coefficients. The semiconductor region 32 (triangle) has a smaller sheet resistance than the resistance of the strips 30, 31. Also, electrode lead-out regions are provided at the other ends of the strips 30, 31, which regions have low resistance, extend in a direction of small piezo-resistive coefficients, and extend beyond the edge of the diaphragm so the electrodes contact the semiconductor body outside the diaphragm. The resistive strips 30, 31 are connected in a Wheatstone bridge. Deformation of the diaphragm causes the diffused resistor layers (i.e. the piezo-resistive strips) to expand or shrink so as to change their resistances. The pressure sensor senses a pressure change by electrically detecting the change of the resistances.

However, this pressure sensor is not very accurate in all circumstances, e.g. in case of temperature fluctuations, and in case of residual package-stress.

SUMMARY OF THE INVENTION

It is an object of the present invention to provide a good semiconductor pressure sensor.

In particular, it is an object of embodiments of the present invention to provide a pressure sensor with a good accuracy, in particular in case of a non-uniform temperature (e.g. temperature gradient) of the semiconductor substrate and/or in case of packaging-stress and/or in case of a non-uniform electric field, or combinations thereof.

It is an object of embodiments of the present invention to provide a pressure sensor with improved linearity and/or improved sensitivity, while being relatively insensitive to a temperature gradient, and in particular embodiments to be also relatively insensitive to uniform (non-radial) package stress and/or also relatively insensitive to an electric field perpendicular to the sensor surface.

These objectives are accomplished by a device according to embodiments of the present invention.

In a first aspect, the present invention provides a semiconductor pressure sensor for determining an external pressure exerted on the sensor, comprising: a membrane as part of a semiconductor substrate for being deformed due to the external pressure, having a membrane edge and a membrane thickness; a first resistor pair located on or adjacent to a first side portion of the membrane, the first resistor pair comprising a first resistor connected between a first bias node and a first output node, and a second resistor connected between said first bias node and a second output node different from the first output node, the resistance of the second resistor being equal to that of the first resistor; a first current source connected or connectable to the first output node and adapted for causing a first predefined current to flow through the first resistor so that the first output node assumes a first output voltage; a second current source connected or connectable to the second output node and adapted for causing a second predefined current to flow through the second resistor so that the second output node assumes a second output voltage, wherein the second predefined current is substantially equal to the first predefined current; the first resistor comprising one or more first elongated piezo-resistive strips arranged in a first direction for measuring deformation of the membrane due to the external pressure to be measured, the second resistor comprising one or more second elongated piezo-resistive strips arranged in a second direction for measuring deformation of the membrane due to the external pressure to be measured, wherein the second direction is substantially perpendicular to the first direction; the first and second output voltage forming a first differential voltage signal indicative of the external pressure to be measured.

It is an advantage that each output node is connected to a current source in order to obtain an output voltage between the nodes which is proportional to the external pressure.

It is an advantage that the first resistor and the second resistor are located on the same side (e.g. edge of a square membrane), because by doing so, the distance between the resistors is small, and thus the temperature of both resistors is substantially the same. Since the resistance of the first and second resistor is equal, and since both resistors are made of the same material, the resistance of both resistors will vary with temperature, but in the same way (e.g. both increase with 5%). This will cause both output voltages to decrease with an equal amount, but will not influence the difference between them. In other words, this circuit is substantially insensitive to temperature variations (over time), and to temperature gradient over the membrane.

It is an advantage of using a current source, connected in series with a single resistor (not two resistors, as is the case for a Wheatstone-sub-circuit), because it allows a larger current (approximately equal to the supply voltage divided by the nominal resistance value=VDD/R) to flow through the resistor, in contrast to only VDD/2R in case of a Wheatstone sub-circuit. Since this applies to both output nodes, the sensitivity is typically increased by 80% to 95% (as compared to a Wheatstone sub-circuit).

It is an advantage of using a current source, because it allows a fixed current to be sent through the resistor, which current is independent of the applied pressure, which removes a cause of non-linearity found in a Wheatstone-sub-circuit, where the current through a particular resistor (for example R2 in FIG. 2) varies with the applied pressure (because R1 and R2 do not change in the same amount under external pressure), and since also the resistance value itself varies with the applied pressure (due to the piezo-resistive effect), the voltage over said resistor in a Wheatstone-sub-circuit varies non-linearly with pressure.

Thus, the pressure sensor according to the present invention has a higher sensitivity and an improved linearity over (at least some) prior art pressure sensors.

Preferably the layout of the first and the layout of the second resistive strips are matched.

It is an advantage of embodiments of the present invention that good accuracy, e.g. improved accuracy is provided, even in the presence of a non-uniform temperature and/or a non-uniform stress and/or a non-uniform electric field, and even when said temperature, stress or field varies over time.

In an embodiment, the semiconductor pressure sensor further comprises: a first readout circuit comprising a first differential amplifier for converting the first differential voltage signal into a first pressure signal indicative of the pressure to be measured.

In an embodiment, the first and the second piezo-resistive strips are formed as p doped regions within an n-well; and the biasing node is electrically connected to the n-well.

It is an advantage of such embodiments that the biasing voltage (preferably the supply voltage of the chip), is applied to the n-well and also to one end of the resistor, because this will cause a minimum (average) thickness of the depletion layer between the (p-doped) resistor and the (n-doped) n-well, allowing a higher circuit bandwidth.

In an embodiment, the semiconductor pressure sensor further comprises: a second resistor pair located on or adjacent to a second side portion of the membrane, wherein the second side portion is located substantially or precisely at 90° angular distance from the first side portion as measured from a center of the membrane; the second resistor pair comprising a third resistor connected in parallel with the second resistor between said first bias node and said second output node, and a fourth resistor connected in parallel with the first resistor between said first bias node and said first output node; the third resistor comprising one or more elongated piezo-resistive strips arranged in the first direction, the fourth resistor comprising one or more elongated piezo-resistive strips arranged in the second direction.

It is an advantage of connecting the first and fourth resistor in parallel to the first current source, and to arrange them in the manner described, because by doing so, they behave similarly to radial stress (e.g. both increase), but oppositely to uniform stress. Hence the voltage created by the first current flowing through their parallel-connection has a high sensitivity to radial stress (e.g. caused by external pressure), and a reduced sensitivity to uniform stress (e.g. caused by package stress).

By locating the third and fourth resistor closely together (on a second side of the membrane), they will both have a similar temperature behavior (e.g. both increase or both decrease with temperature). Since R1 and R2 behave identically with temperature T1 (at a first side of the membrane), and R3 and R4 behave identically with temperature T2 (at a second side of the membrane), the parallel connection of R1 with R2 on the one hand, and R3 and R4 on the other hand, will behave almost identically with temperature variations (in first order), while being (relatively) insensitive to a temperature gradient over the membrane.

Thus this embodiment has the same advantages as mentioned above (high sensitivity, good linearity, low temperature influence), but in addition has a low sensitivity to uniform stress (e.g. package stress).

In an embodiment, the semiconductor pressure sensor further comprises:—a third resistor pair arranged at the first side portion of the membrane but outside of the membrane, the third resistor pair comprising a fifth resistor connected between said first bias node and a third output node, and a sixth resistor connected between said first bias node and a fourth output node different from the third output node; a third current source connected to the third output node and adapted for causing a third predefined current to flow through the fifth resistor so that the third output node provides a third output voltage; a fourth current source connected to the fourth output node and adapted for causing a fourth predefined current to flow through the sixth resistor so that the fourth output node provides a fourth output voltage, wherein the third and fourth predefined current is substantially equal to the first predefined current; the fifth resistor comprising one or more elongated piezo-resistive strips arranged in the first direction, and the sixth resistor comprising one or more elongated piezo-resistive strips arranged in the second direction for measuring packaging stress; and a fourth resistor pair arranged at the second side portion of the membrane but outside of the membrane, the fourth resistor pair comprising a seventh resistor connected in parallel with the sixth resistor between said first bias node and said fourth output node, and an eighth resistor connected in parallel with the fifth resistor between said first bias node and said third output node, the seventh resistor comprising one or more elongated piezo-resistive strips arranged in the first direction, the eighth resistor comprising one or more elongated piezo-resistive strips arranged in the second direction; wherein the one or more piezo-resistive strips of the fifth and sixth and seventh and eighth resistor are arranged at a distance from the membrane edge of at least 4.0 times the membrane thickness for only measuring stress exerted by packaging on the semiconductor substrate; the third and fourth output voltage forming a second differential voltage signal indicative of the package stress.

By locating the third and fourth resistor pairs on the substrate outside the membrane, at a distance from the membrane edge of at least 4 times (≥4×) the membrane thickness, e.g. at least 8 times (≥8×) the membrane thickness, these strips are only sensitive to (radial) package stress, but not to deformation of the membrane due to the external pressure, in contrast to the first and second resistor pairs, being mainly located on the membrane, within a distance of at most 3 times (≤3×) the membrane thickness, which are sensitive to both (radial) package stress and the external pressure to be measured.

The second differential voltage signal can be read by a second readout-circuit (e.g. comprising a differential amplifier, ADC, etc), and may be used by a processing unit for display, or for compensating the first differential voltage signal against package stress, e.g. by subtracting the second differential signal from the first differential signal. In this way, the package stress can be largely compensated for, or the influence thereof can at least be reduced in the final stress measurement value.

Thus, a semiconductor pressure sensor is provided with a reduced sensitivity to common mode temperature, e.g. ambient temperature (by using differential signaling), and to temperature gradients (by arranging the resistors "closely together" as pairs), and to common mode package stress (by using the third and fourth resistor and third and fourth current source, outside of the membrane), and having an increased sensitivity and improved linearity (by using current source rather than voltage source), and having a low or reduced sensitivity to temperature gradient (by using a parallel connection of resistors located at different locations), and having a reduced sensitivity to uniform stress (by locating the piezo-strips of the four resistors at 90° angular position on the membrane and by orienting the piezo-strips of the four resistors in parallel or at 90° as recited in the claim).

In an embodiment, the semiconductor pressure sensor further comprises: a multiplexer for selectively applying the first differential voltage signal and the second differential voltage signal to the first differential amplifier; and/or a second readout circuit comprising a second differential amplifier for converting the second differential voltage signal into a second pressure signal indicative of the package stress.

In an embodiment, each of the resistors comprises at least two or at least three piezo-resistive strips connected in series.

By providing at least two or at least three piezo-resistive strips connected in series, the resistance value can be increased without having to decrease the doping level. This is especially advantageous when dimensions of the chip become smaller due to technology scaling. The piezo-resistive strips of each individual resistor are oriented in parallel.

In an embodiment, each of the resistors comprises an equal number of elongated piezo-resistive strips, and the dimensions of all piezo-strips is identical.

In other words, preferably the layout of the piezo-resistive strips, and also the interconnections between the strips belonging to a single resistor, is identical (apart from rotating, shifting, mirroring), so that the resistors are better "matched". This offers the advantage that the resistance of the first, second, etc. resistors is equal within the tolerance margin of the process (e.g. within +/−0.5%).

In an embodiment, a layout of each resistor pair further comprises a first and second leadout region for electrical interconnection to the outer nodes, and a third leadout region for electrical interconnection to the common biasing node, whereby the third leadout region is located between the first and second leadout region.

In contrast to known layout structures of two resistors which are connected to a common node, and whereby the common (central) node is interconnected by routing over the membrane, it is an advantage of routing the common node as recited in the claim, because in this way the interconnection on the membrane is minimized, which may further reduce pressure influences and thus improve linearity.

In an embodiment, the substrate is a CMOS wafer; and the membrane is located in the (100) plane, and at least one of the piezo-resistive elements is oriented in the <110> direction.

It is an advantage of using this crystallographic plane and directions, because this direction is a direction of maximum piezo-resistive effect. By using this direction, a sensor having an improved, e.g. maximum sensitivity can be obtained.

In an embodiment, the membrane has a square or circular shape.

When the membrane has a square shape, it is advantageous to orient the sides of the square in crystallographic directions of maximum and minimum piezo-sensitivity.

It is furthermore advantageous to locate the first and second resistor close to the middle of one of the sides of the square membrane. When a pressure is exerted on the square membrane, the deformation is larger in the middle of the sides than near the corners, and larger on the sides than in the center of the membrane, thus by providing the resistors substantially in the middle of the sides, the sensitivity of the pressure sensor is increased, e.g. maximized.

In embodiments having also a third and fourth resistor, it is advantageous to locate the latter on a second side of the membrane, adjacent the first side (thus at 90°) rather than at the opposite side of the membrane (thus at 180°), because the arrangement at 90° allows the resistors to be oriented in such a way that the sensor has a reduced sensitivity to uniform stress (e.g. package stress).

In case of a circular shape, it is advantageous to locate the resistor pairs at the same locations as described above, for an imaginary square shape tangential to the circular membrane.

In a second aspect, the present invention provides a semiconductor device comprising a semiconductor pressure sensor according to the first aspect.

In a third aspect, the present invention provides a method of determining an external pressure exerted on a semiconductor substrate, the semiconductor substrate comprising: a membrane arranged for being deformed due to the external pressure, and having a membrane edge and a membrane thickness; a first resistor pair located on or adjacent to a first side portion of the membrane, the first resistor pair comprising a first resistor connected between a first bias node and a first output node, and a second resistor connected between said first bias node and a second output node different from the first output node, the resistance of the second resistor being equal to that of the first resistor; the first resistor comprising one or more first elongated piezo-resistive strips arranged in a first direction for measuring deformation of the membrane due to the external pressure to be measured, the second resistor comprising one or more second elongated piezo-resistive strips arranged in a second direction for measuring deformation of the membrane due to the external pressure to be measured, wherein the second direction is substantially perpendicular to the first direction;

the method comprising the steps of: connecting a first current source to the first output node, the first current source being adapted for causing a first predefined current to flow through the first resistor so that the first output node assumes a first output voltage; connecting a second current source to the second output node, the second current source being adapted for causing a second predefined current to flow through the second resistor so that the second output node assumes a second output voltage, wherein the second predefined current is substantially equal to the first predefined current; obtaining a first differential voltage signal over the first and second output node as an indication of the external pressure to be measured.

In an embodiment, the method is performed using a substrate that further comprising a second resistor pair arranged as described above.

In an embodiment, the method is performed using a substrate that further comprises a third and a fourth resistor pair as described above, and the method further comprising the step of: applying a third predefined current to said parallel connection of the fifth resistor and the eighth resistor using a third current source; and applying a fourth predefined current to said parallel connection of the sixth resistor and the seventh resistor using a fourth current source; and measuring a second differential voltage signal over the third and fourth output node; and correcting a value corresponding to the first differential voltage signal with a value corresponding to the second differential voltage signal.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 11 shows an enlarged (and mirrored) view of the piezo-resistive strips of FIG. 10, with an indication of "the largest distance" MD between a point of the first resistor strips and a point of the second resistor strips.

FIG. 12 is an schematic representation of radial stress at four locations of a square or circular membrane, which stress is typically caused by a pressure (to be measured) exerted on the membrane in a direction perpendicular to the substrate.

FIG. 13 is an schematic representation of uniform (non-radial) stress (in the example shown: from left to right) at four locations of a square or circular membrane, which stress may be caused by packaging.

Figure 9:
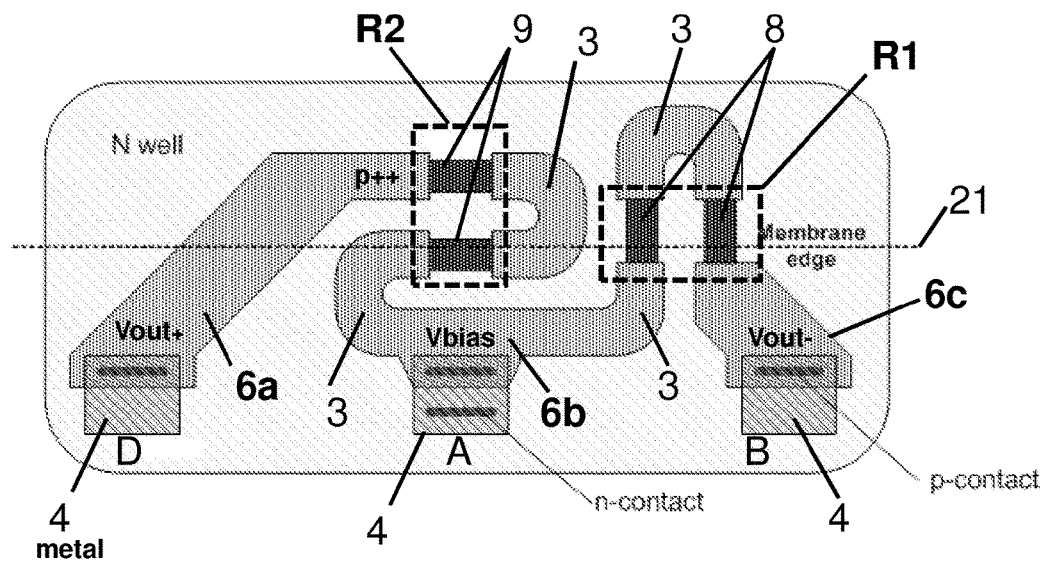
FIG. 9 shows an example of a layout pattern comprising a pair of resistors, connected in parallel to a common biasing node, and lead-out portions, as can be used in a pressure sensor according to embodiments of the present invention.
Figure 10:
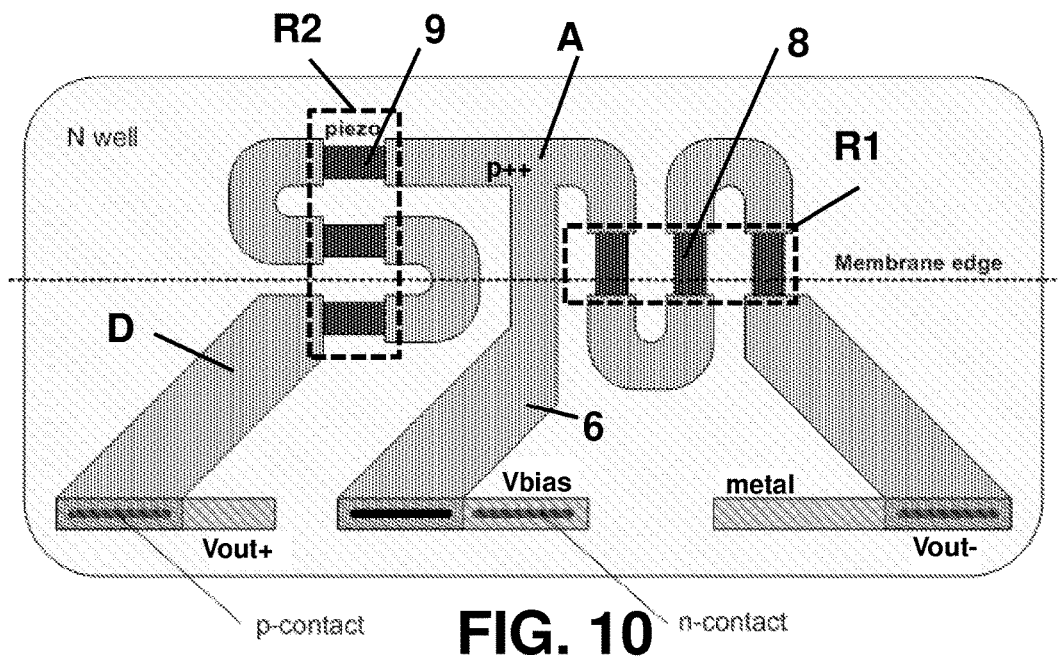
FIG. 10 shows a variant of the layout pattern of FIG. 9, whereby each resistor contains three piezo-resistive strips connected in series, instead of only two.

The drawings are only schematic and are non-limiting. In the drawings, the size of some of the elements may be exaggerated and not drawn on scale for illustrative purposes (for example the relative dimensions of the resistors versus the dimension of the membrane). It is noted however that FIG. 9 and FIG. 10 are drawn to scale.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Definitions

In the present invention, the terms "diaphragm" and "membrane" are used as synonyms for indicating a region of a semiconductor substrate with a reduced thickness as compared to the surrounding substrate material (also referred to as "bulk"), adapted to mechanically deform when an external pressure (to be measured) is applied thereto.

When in the present invention, reference is made to "largest dimension of the membrane" or simply "dimension of the membrane", reference is made to the length of a side in case the membrane has a substantially square shape, or to the distance between opposite sides in case the membrane has a square shape with rounded corners, or to the diameter in case the membrane is substantially circular, or the length of the largest axis in case the membrane is substantially elliptical, or to the larger of the length and the width in case the membrane is substantially rectangular, or to the diameter of the inner circle in case the membrane has a regular polygonal shape, such as e.g. a hexagonal or octagonal shape.

The term "thickness of the membrane" has its usual meaning, as can be measured in a direction perpendicular to the substrate surface.

The term "current source" or "current sink" has its usual meaning. An ideal current source is an electronic circuit that delivers or absorbs an electric current which is independent of the voltage across it. The internal resistance of an ideal current source is infinite. In embodiments of the present invention, the current source has an internal resistance of at least five times the resistance of the resistor connected thereto.

The term "differential voltage" has its usual meaning. It means the voltage difference between two nodes, as opposed to a single-ended voltage signal of a single node (implicitly measured relative to ground voltage).

With "resistance" is meant "electrical resistance", unless explicitly mentioned otherwise.

With "external pressure" is meant e.g. air pressure or gas pressure or fluid pressure of the environment wherein the pressure sensor is located, in contrast to "internal pressure" e.g. caused by the packaging of the semiconductor sensor.

Figure 1:
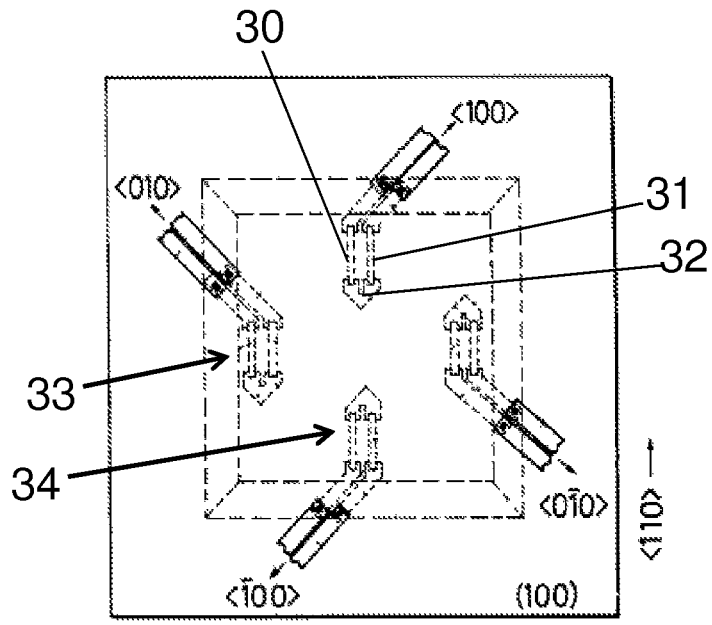
FIG. 1 shows a semiconductor pressure sensor, known in the art.

Crystallography:

While the circuit of U.S. Pat. No. 4,672,411 (Hitachi), described in the background section and illustrated in FIG. 1 has some drawbacks, many of the basic principles described therein are also used in the present invention. For example, the membrane edges of embodiments of the present invention are preferably realized in such a way that maximum stress caused by the applied pressure is reached in at least two areas perpendicular to the membrane edge and where the membrane edge is oriented in the <110> direction. Anisotropic etching of square membranes in silicon is often used as it creates four of such areas at the middle of the membrane edges due to the anisotropic etch stop on <111> planes. By using other etching methods, round membranes would also result in four of such areas and oval membranes in two of such areas on the shorter diameter. The stress sensitivity of piezo-resistors also depends on the crystal orientation and the p doped resistors have a maximum change in resistance along the <110> directions, and a minimum change in resistance along the <100> directions, at 45° from the <110> directions. Metal connections cause stress in the silicon and due to creep this stress can also change over time. Therefore a highly doped p doped path is realized between the metal and the piezo-resistive strips. By placing these highly p doped paths in the <100> directions at 45 degrees of the <110> directions one assures that stress from the metal lines does not change the resistance of these strips.

In order to avoid unnecessary repetition of these basic concepts, the present application will not go into the details of crystallographic planes and directions, and will concentrate on the contribution of the present invention over the prior art. The reader may refer to U.S. Pat. No. 4,672,411 for more details which is incorporated herein by reference, in particular to FIG. 9 thereof, and the corresponding part of the description. Although other crystallographic directions may also be used, the principles of the present invention will be explained assuming that the membrane 2 of a pressure sensor according to the present invention is located in an (100) crystallographic plane of a CMOS wafer, and that the piezo-resistive strips 8,9,10,11 are located in the <110> directions. Using CMOS wafers allows the combination of the pressure membrane and CMOS circuitry, e.g. at least readout-circuitry, to be integrated on the same wafer.

Wheatstone Bridge:

Before a pressure sensor according to embodiments of the present invention is described, first the principles of a Wheatstone-bridge circuit are explained, because this is often used in prior art pressure sensors, and it helps to explain similarities and differences with the present invention.

Figure 2:
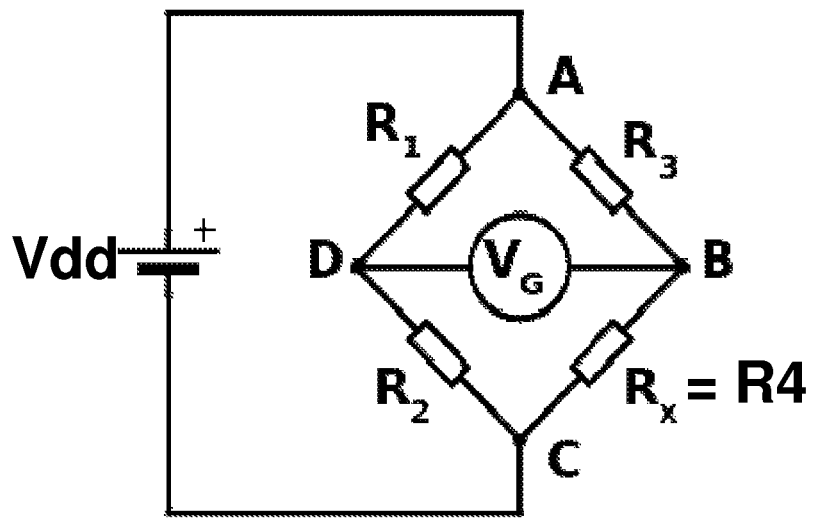
FIG. 2 shows a Wheatstone bridge configuration with two branches (left, right), each comprising two resistors, known in the art.

Wheatstone-bridge circuits with four resistors R1, R2, R3, R4 arranged as shown in FIG. 2, are well known in the art. Such circuits are very well suited for determining an unknown resistor value Rx, when three other resistor values R1, R2 and R3 are known, or for detecting/measuring small resistance changes when all four resistor values are known. The bridge of FIG. 2 has four resistors R1, R2, R3 and R4 (or Rx). When a supply voltage (e.g. a DC voltage) Vdd and Gnd are applied to the nodes A and C, respectively, a first current will flow from A to C through the first branch formed by R1 in series with R2, and a second current will flow through the second branch formed by R3 in series with R4. A differential voltage output "Vout" is provided over the nodes D and B, and defines a differential voltage: Vout=Vd−Vb. The voltages Vd and Vb can be read-out by a circuit having a large input impedance (in order not to draw additional current). Typically the nodes D and B are connected to a differential amplifier which amplifies the differential voltage Vout. The amplified signal can then be used for further processing.

When the bridge is "in balance", the following formula applies:

$$R1/R2=R3/R4 \qquad (1)$$

which is equivalent to:

$$R1 \times R4 = R2 \times R3 \qquad (2)$$

When the bridge is in balance, the voltage "Vd" at the node D between R1 and R2 will be exactly equal to the voltage "Vb" at the node B between R3 and R4, and no current will flow in a path between the nodes B and D (e.g. through a galvanometer, indicated by Vg). When one or more of the resistor values R1 to R4 deviate, even slightly, from this balance situation, the bridge is no longer in balance, and a voltage difference Vout will appear over the nodes D and B, which can be measured in any manner known in the art, e.g. typically by a differential amplifier having an amplification factor of about 100 or more. When all resistors R1, R2, R3, R4 are made of the same material, and have the same value R, such a bridge circuit is relatively insensitive to common mode temperature changes, because the temperature of all resistors R1 to R4 increases or decreases with a same percentage.

Ideal/Non-Ideal Pressure Sensor:

An ideal pressure sensor has a high sensitivity (large output signal for even a small pressure), has zero offset, has a perfect linear behaviour (output voltage exactly proportional to the applied pressure), and is insensitive to temperature variations and package stress. Furthermore it is insensitive to electric fields perpendicular to the surface.

In reality, of course, an ideal pressure sensor does not exist, and ways need to be found to reduce or remove causes of non-linearity, and/or to reduce the effects of temperature stress and/or electric field-variations.

"Zero offset" means that the voltage output over the nodes D and B should be exactly zero when no pressure is applied to the membrane 2, and ideally this value should remain exactly zero irrespective of the sensor temperature in the absence of external pressure. In practice, however, the output voltage value Vg corresponding to zero-pressure, is not exactly zero, and needs to be compensated for, in order to achieve an accurate pressure measurement value. This non-zero value is called "zero-offset", i.e. the voltage offset value between nodes D and B when no external pressure is exerted on (or applied to) the sensor membrane. There may be various causes of such zero-offset, e.g. mismatch between the various resistance values due to imperfections of the semiconductor processing, residual stresses in the membrane due to packaging of the semiconductor (e.g. silicon) die, or an inhomogeneous electric field perpendicular to the substrate, which modifies the resistors not in the same way (depletion layer changes). While for discrete (thick film) resistors, a mismatch between the various resistance values due to semiconductor processing may be corrected by laser trimming at the production stage, laser trimming is not used for piezo resistors that are part of a CMOS circuit. In addition, also several other effects, such as e.g. stress due to packaging and temperature gradient (i.e. when the different resistors do not have the same temperature) remain.

Known Techniques:

Various attempts have been made in the art for reducing the zero-offset.

Figure 3:
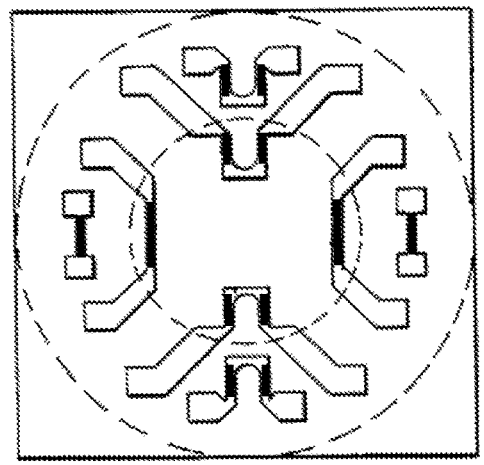
FIG. 3 shows another semiconductor pressure sensor, with one bridge on, and one bridge outside of the membrane, known in the art.

For example, FIG. 3 shows a prior art pressure sensor disclosed by Honeywell in EP0083496. It is noted that in the illustration in the present document black lines are added to FIG. 3, to clearly indicate the position and orientation of the piezo-resistive strips. This sensor has a first bridge with resistors located on the membrane for measuring the external pressure exerted on the membrane. This first bridge has a zero-offset due to temperature variations and due to package stress. This offset—may be compensated by using the output of a second bridge, having four resistors located outside the membrane. This total double bridge sensor provides a pressure value that is compensated for package stress, however, the compensation is not perfect.

Other techniques for zero-offset compensation, for example by measuring the offset (at zero external pressure) during a calibration stage, and storing the offset-values in a non-volatile memory (e.g. flash), and compensating the readout by measuring the temperature, and by subtracting the stored value, are also known in the art.

However, it has proven to be extremely difficult to find a single solution that simultaneously solves all problems. Therefore, in practice, always some compromises need to be made, for example in terms of linearity (preferably perfectly linear), sensitivity to external pressure (depending on the application, but usually preferably as high as possible), sensitivity to temperature variations and temperature gradient (preferably as low as possible in a particular temperature range), sensitivity to package stress and drift (preferably as low as possible).

Figure 4:
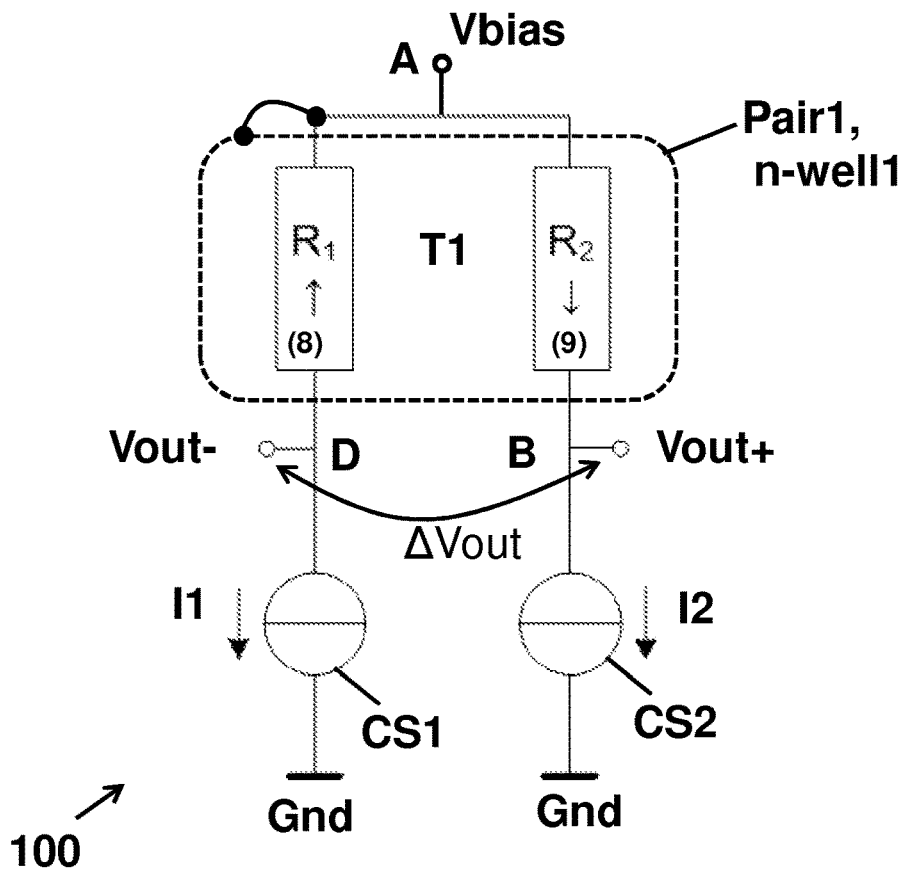
FIG. 4 shows a schematic block-diagram of a first embodiment of a pressure sensor according to the present invention, having a resistor pair (connected in parallel to a common biasing node), the other ends of the resistors being connected to two current sources.
Figure 5:
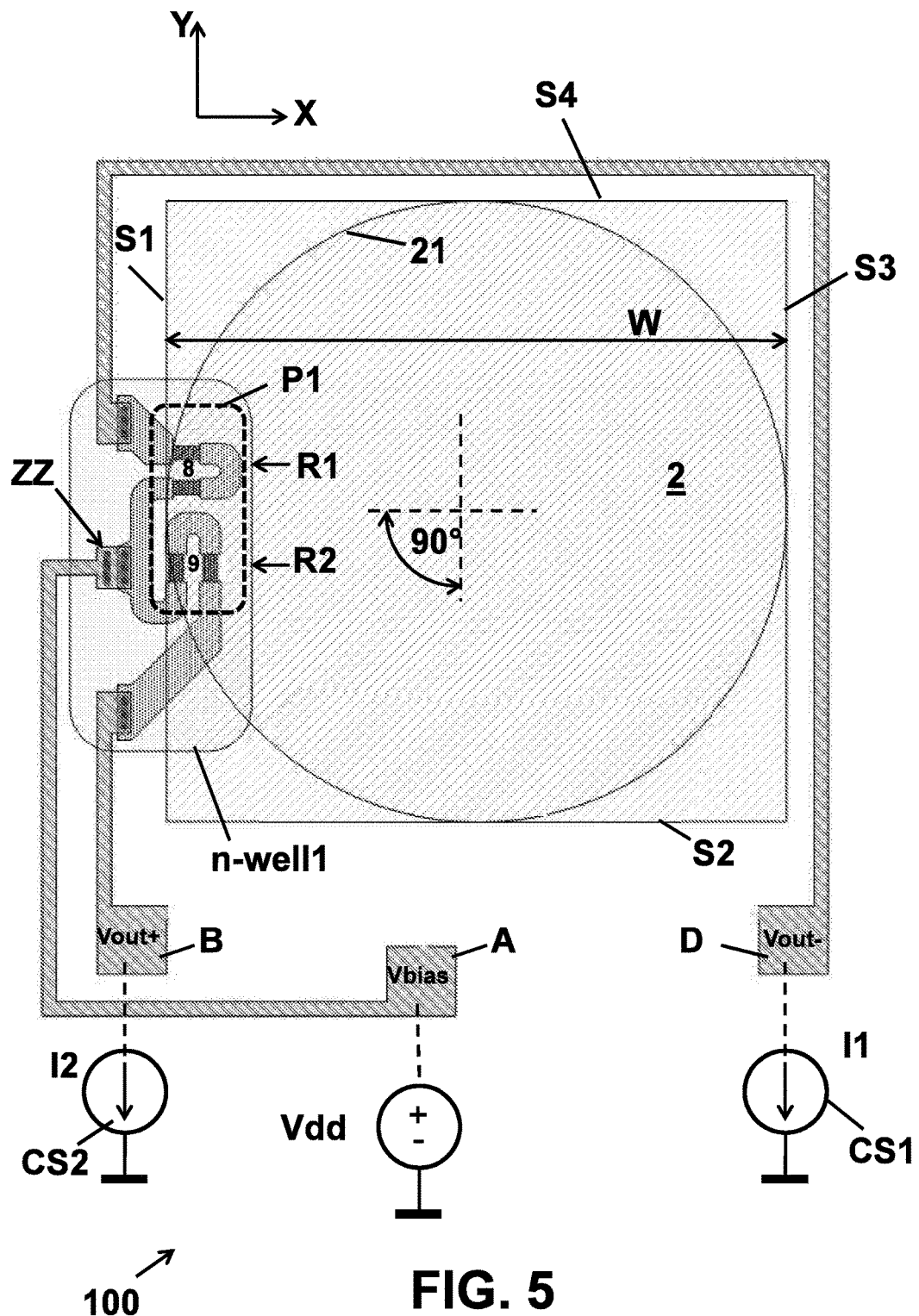
FIG. 5 shows an exemplary layout of (part of) the pressure sensor of FIG. 4.

Present Invention:

FIG. 4 shows a schematic block-diagram and FIG. 5 shows an example of a partial layout of a first embodiment of a semiconductor pressure sensor 100 according to the present invention.

It is repeated that the drawing of FIG. 5 (and FIG. 8 and FIG. 14) are not necessarily drawn to scale, and that the relative dimensions of different elements in a single drawing need not be exactly the same as those shown in the drawings. For example, the length of the piezo-resistive strips may be a value in the range of 6 μm to 60 μm, and the width of the membrane may for example be a value in the range of 150 μm to 1500 μm, but the ratio of the length of the strip and the width of the membrane need not be equal to ⅒, but may for example be a value in the range of ¹⁄₅₀ to ⅒, for example be a value in the range of 0.5% to 30%, or be a value in the range of 1% to 20%, or a value in the range of 2% to 10%, for example about 4% or about 8% or about 12% or about 15%.

The pressure sensor 100 comprises a membrane 2 as part of a semiconductor substrate having a shape and dimensions for allowing the membrane 2 to be mechanically deformed due to an external pressure. The membrane 2 has a membrane edge 21 and a membrane thickness. The membrane 2 advantageously has a square or circular shape, but other shapes may also be used, for example: rectangular, polygonal, hexagonal, octagonal, or any other suitable shape.

The pressure sensor 100 further comprises a (first) resistor pair P1 located on or adjacent to a first side portion S1 of the membrane 2. The (first) resistor pair P1 comprises a first resistor R1 connected between a first bias node A and a first output node D, and a second resistor R2 connected between said (same) first bias node A and a second output node B, different from the first output node D.

During operation, a biasing voltage, e.g. the chip supply voltage VDD is applied to the biasing node A. This offers the advantage that the highest (on chip) voltage is applied to the common node of the resistors, and that all resistors are connected to a low-ohmic voltage source (thus, the voltage value will not significantly change, when a current is drawn). In the embodiment of FIG. 4 and FIG. 5, this low-ohmic contact is also used to maintain the potential of the n-type silicon around the p-type piezoresistors the same or higher than the local potential of the p-type resistors to form an isolating depletion layer.

The (electrical) resistance of the second resistor R2 is substantially equal, e.g. equal to that of the first resistor R1 (in the absence of external pressure), within a very small tolerance margin (e.g. less than 1%, preferably less than 0.25%), which is achieved inter alia by matching the layout of the resistors, and in some embodiments, by placing the two resistors in a single N-well.

The pressure sensor 100 further comprises a first current source CS1 connected to the first output node D and adapted for causing a first predefined current I1 to flow through the first resistor R1 so that the first output node D assumes a first output voltage Vout−, and a second current source CS2 connected to the second output node B, and adapted for causing a second predefined current I2 to flow through the second resistor R2 so that the second output node B assumes a second output voltage Vout+. Current sources adapted for providing a current which is quite independent of temperature, are well known in the art of semiconductor devices, and hence need not be described in detail here. The current sources CS1 and CS2 are "matched", and provide a predefined current I1 and I2, which are identical within a tolerance margin less than 1.0%, preferably less than 0.5% or even less than 0.25%. In preferred embodiments, the current source CS1 and CS2 have substantially the same quality of matching as the resistors R1, R2 or better by using switching techniques. The current sources CS1, CS2 have a "large" output impedance, e.g. at least 5 times the resistance R1, R2, for example at least 10 times or at least 20 times.

As can be seen from FIG. 5 (and FIG. 9 and FIG. 10 in even more detail), the first resistor R1 comprises one or more, for example two or three first elongated piezo-resistive strips 8 arranged in a first direction X for measuring deformation of the membrane 2 due to the external pressure to be measured. Likewise the second resistor R2 comprise one or more, for example two or three second elongated piezo-resistive strips 9 arranged in a second direction Y, substantially orthogonal to the first direction X, for measuring deformation of the membrane 2 due to said external pressure. Preferably the layout of the first and second resistive strips 8, 9 are matched, meaning that the strips have an identical layout (apart from translation, rotation, and mirroring.

Referring back to FIG. 4, it is noted that the "arrow up" in R1 and the "arrow down" in R2 is a graphical indication that, R1 and R2 are arranged such that, if R1 increases due to external pressure, then R2 decreases, or vice versa.

It is also noted that, in FIG. 4 and FIG. 5, the current sources CS1 and CS2 are directly connected to the resistors R1, R2 and to ground, but that is not absolutely required for the present invention. However, any additional components (e.g. resistor, diodes, etc) in the path from the node A through R1 and CS1 and Ground would decrease the available voltage swing of the Vout– signal, which is undesirable, because it negatively influences the sensitivity.

Advantages of the Present Invention:

As can be seen in FIG. 5, the first resistor R1 and the second resistor R2 are deliberately located on the same side (more specifically near the middle of a first side S1 of a square membrane), rather than being arranged on different sides of the membrane 2. By doing so, the distance between the resistors is "small", and thus the temperature T1, T2 of the resistors R1, R2 is substantially the same (T1≈T2). Since the resistance of the first and second resistor is equal, and since both resistors are made of the same material, the resistance of both resistors will vary with temperature in the same way (e.g. both increase with 5% when temperature increases). It does not matter whether this variation is linear or non-linear with temperature, as long as the function is the same for both resistors, which is the case when the same material is being used. Such an increase (or decrease) of resistance R1, R2 with temperature will cause both output voltages Vout–, Vout+ to decrease (or increase) with approximately the same amount (in first order), but will not significantly influence the difference between them. In other words, temperature variations show (primarily) as a common mode signal, but do not influence the differential signal. From the above it can be understood that the circuit of FIG. 4 is substantially insensitive to temperature variations (over time), and also to a temperature gradient over the membrane 2 (due to the resistors being located in close vicinity). The insensitivity to a temperature gradient is a major advantage of the present invention.

By using a current source CS1 connected in series with a single resistor R1 (not two resistors in series, as is the case for a Wheatstone-bridge), allows to use a larger current I1 to flow through the resistors (e.g. in the order of VDD/R–0.3V assuming a voltage drop across the current source of 0.3 V, instead of VDD/2R in case of a Wheatstone-bridge). For a supply voltage VDD of about 3.3V, this means that the sensitivity of the circuit of FIG. 4 is increased roughly by 80%. This increased sensitivity is a major advantage of the present invention.

The first and second output voltage Vout–, Vout+ form a first differential voltage signal ΔVout indicative of the external pressure to be measured. The first differential voltage signal ΔVout is substantially proportional to the external pressure applied to the pressure sensor, because the circuit provides two output voltages which vary linearly with change of the resistance R1, R2, which in turn vary linearly with deformation of the membrane, which is turn varies linearly with the amount of external pressure applied to the membrane 2. The circuit of the present invention provides a better linearity than prior art circuits using a Wheatstone-bridge, because the current flowing through the current sources CS1, CS2 (of the present invention) is independent of the pressure applied to the membrane, whereas the current flowing through the left and right branch of a Wheatstone bridge does change with the applied pressure, because the transversal piezo-resistive coefficient is not as large as the longitudinal piezo-resistive coefficient, thus the total resistance of R1+R2 (see FIG. 2) does change with external pressure, hence the current flowing through the left branch I=Vbias/(R1+R2) does changes with pressure, which introduces a non-linearity in the sensitivity. This non-linearity is avoided in the circuits proposed by the present invention by using the current sources CS1, CS2. It is a major advantage of the present invention that it provides an output signal ΔVout with an improved linearity.

Resistor Layout:

FIG. 9 shows the layout pattern of FIG. 5 in more detail (and mirrored). The "lead-out regions" 6, as well as "corner parts" 3 interconnecting the piezo-resistive strips 8, 9 are made of a heavily-doped layer of the first dopant type, for instance a heavily-doped p+ type diffused layer. They have a relatively low electrical resistance, and extend in a direction of relatively small piezo-resistive coefficients (in the example shown, preferably at angles of +/−45° with respect to the first and second direction Y, X). The lead-out regions 6 extend beyond the edge 21 of the membrane 2, and are in ohmic contact with conductor electrodes, e.g. metal electrodes 4, located on the bulk, outside of the membrane 2. Such metal electrodes 4 may e.g. comprise aluminum.

Since the diffused layers of the first dopant type, e.g. p type diffused layers, 8, 9 constituting the pressure sensing elements have a relatively large, e.g. the maximum, piezo-resistive coefficient, their electrical resistance is varied greatly by a strain which develops due to the deformation of the semiconductor, e.g. silicon, membrane 2. That is, these pressure sensing elements are very sensitive to a pressure or the like. In contrast, since the diffused layers are heavily doped with dopants of the first dopant type, e.g. heavily-doped p+ diffused layers, the interconnections 3 and 6 are arranged in orientations of relatively small, e.g. minimum piezo-resistive coefficients, they are the least sensitive to a pressure change. By orienting the piezo-resistive strips 8 of the first resistor R1 close to and orthogonal to the piezo-resistive strips 9 of the second resistor R2, a pressure exerted on the membrane 2 will have an opposite effect on the electrical resistance of the first and second resistors R1, R2, in the sense that, when the resistance of the first resistor R1 increases due to pressure exerted thereon, the resistance of the second resistor R2 decreases, and vice versa, causing the first output voltage Vout− to decrease and the second output voltage Vout+ to increase (or vice versa), thus having an opposite effect on the output voltages, thus providing a differential output signal that strongly varies with applied pressure.

By locating the contacts between the conductive, e.g. metal, electrodes 4 and the lead out regions 6 of the first dopant type, e.g. p+ type lead out regions, largely outside the membrane 2, the influence which is exerted on the deformation of the semiconductor, e.g. silicon, membrane by the residual stress developing in the vicinity of the contact portion, and any hysteresis due to temperature changes, can be reduced, e.g. minimized.

A particular advantage of the layout shown in FIG. 9 is that the lead-out portion 6b of the (common) node A is routed between the lead-out portions 6a, 6b of the output nodes D, B. This offers the advantage that the routing passes only over a minimal distance (or no distance at all) over the membrane 2.

In the example shown in FIG. 9, the resistors R1 and R2 are of p type semiconductor material, embedded in an N-well structure. In preferred embodiments of the present invention, the N-well is electrically connected to the biasing node A (as explicitly shown in FIG. 4 and FIG. 6). In some embodiments, the entire membrane is made of n-type material, acting as N-well. In this case the membrane establishes the depletion layer for all resistors. By doing so, the thickness of the depletion layer between the p-type resistor material and the N-well is reduced to a minimum and kept the same for both resistors, which allows a faster readout (higher bandwidth). Indeed, in the embodiment of FIG. 4: at one end of the resistor (connected to the biasing node A) there is zero voltage difference between the resistor and the n-well, at the opposite end of the resistor (at the output node D,B) the voltage difference is I×R, thus there is an average voltage difference of I×R/2 over the depletion layer.

Figure 6:
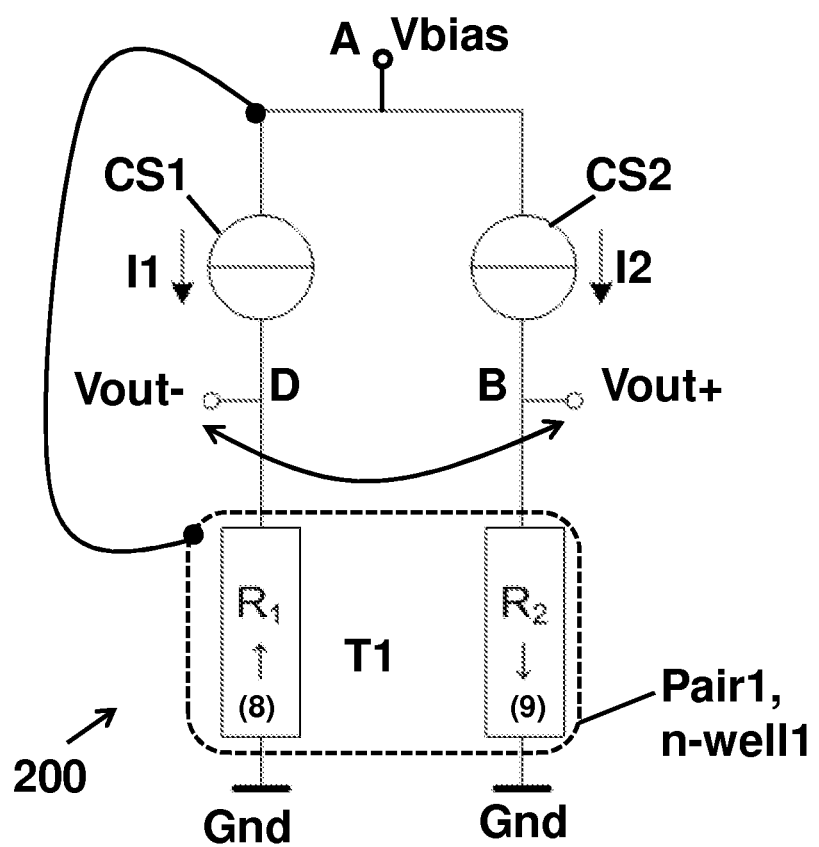
FIG. 6 shows a schematic block-diagram of a second embodiment of a pressure sensor according to the present invention, which is a variant of FIG. 4.

In contrast, in the embodiment of FIG. 6, which is a second embodiment of a pressure sensor 200 according to the present invention, having many of the same features and advantages of the first embodiment of a pressure sensor 100 of the present invention, the voltage difference between the resistor R1, R2 and the n-well is (Vbias−I×R) at one end of the resistor, and is Vbias at the other end of the resistor, thus on average: Vbias−(I×R)/2, which is typically somewhat higher than in the case of FIG. 4. Thus, the depletion layer between the resistors and the N-well will (typically) have a larger thickness T in the embodiment of FIG. 6 as compared to that of FIG. 4, which is disadvantageous for fast readout.

As can be seen, the circuit of FIG. 6 needs four contacts as preferably the n-well is connected to a low ohmic voltage node with a voltage which is equal to or higher than the voltage on the nodes D and B. The depletion layer forms a capacitive load and by connecting it to one of the outputs and not separately the matching of the resistors is compromised as the resistor connected to n-well with have a much higher capacitance than the resistor that is not connected to the well. When the connections to the sensor are made with bond-wires, the configuration of FIG. 6 will need four bondpads whereas the configuration of FIG. 4 needs only three bondpads. In other words: if the resistor-layout structure of FIG. 9 is to be used in the circuit of FIG. 6, either the N-well can be connected to the bias-voltage (e.g. via an additional bondpad, in case the membrane-substrate and the substrate with the current sources is not the same), or alternatively, the N-well can be connected to one of the output nodes, but this has the disadvantage of creating an asymmetric capacitive impedance for the two resistors R1, R2.

FIG. 10 shows another example of a layout pattern as can be used in embodiments of the pressure sensor 100, 200 described above. In this example, each resistor R1, R2 contains three piezo-resistive strips 8, 9 (indicated in dark gray) arranged in "close vicinity" of the membrane edge 21. What is meant with "close" and "near" will be quantified when describing FIG. 11. As shown in FIG. 9 and FIG. 10, the piezo-resistive strips 8, 9 of each particular resistor are parallel to each other, but the piezo-resistive strips of the different resistors of the pair are oriented orthogonally with respect to each other.

FIG. 11 shows an enlarged view of the piezo-resistive strips 8, 9 of FIG. 10. As can be seen, the piezo-resistive strips 8, 9 are located "closely together near the membrane edge". In order to quantify that the resistors R1 and R2 of the first pair P1 are located "close" to each other (as compared to the size of the membrane 2), a maximum distance MD is defined between a point of the first resistor strips 8 (of the first resistor R1) and a point of the second resistor strips 9 (of the second resistor R2), where said points are indicated by black dots for illustrative purposes. In preferred embodiments of the present invention, the ratio of said maximum distance MD and a dimension of the membrane 2 (in case of a square membrane said dimension would be chosen to be the width W of the membrane), i.e. MD/W is less than 50%, preferably less than 40%, preferably less than 35%, preferably less than 30%, preferably less than 25%, preferably less than 20%, preferably less than 15%, such as e.g. about 10%. In case the membrane 2 has a circular shape, the ratio would be calculated as the length of said maximum distance MD over the diameter of the circle. In case the membrane has an elliptical shape, the ratio would be calculated as the maximum distance MD over the larger of the two axes of the ellipse. In case the membrane 2 has a substantially octagonal shape, the ratio would be calculated as the length of said diagonal MD over the distance between opposite sides of the octagonal, etc.

Although not visible in FIG. 9 to FIG. 11, but visible in FIG. 5, the resistors R1, R2 are preferably also located "about in the middle" of the side S1 of the membrane 2, because for a square membrane shape, maximum tensile stress is created in the middle of each side. With "about in the middle of a side" is meant within an imaginary circle having its centre in the middle of the side, and having a diameter less than 50% of the above mentioned "dimension of the membrane" (e.g. the width of a square, the diameter of a circle, etc.), preferably less than 40%, more preferably less than 30%, even more preferably less than 20%. In case of a circular membrane, the membrane does not have "sides", but the same definition can be used considering the tangential square (as illustrated). Also for round membranes the strips have to be aligned in the <110> directions in order to have maximum piezoresistive sensitivity.

As illustrated in FIG. 11, the position of the piezo-resistive strips 8, 9 with respect to the membrane edge 21 (indicated in dotted line), in particular the distance "d1" between the center of the strips 8 and the membrane edge 21, may be chosen to create a maximum of resistance change of the three strips together (e.g. ΔR1) when a pressure is applied. For a chosen number of piezo-resistive strips (e.g. three in the embodiment shown), and for chosen dimensions (length and width of the strips, and distance between the strips), the optimal distance "d1" in terms of maximum sensitivity w.r.t. pressure can be determined, e.g. calculated or calculated or simulated or determined in any other way, e.g. via design variation. Likewise, for a chosen number of strips 9, and for chosen dimensions thereof, an optimal distance "d2" in terms of maximum sensitivity w.r.t. pressure, can be determined. The value of "d2" can be determined independent of the value of "d1", but is dependent on the membrane size and membrane thickness T. Finite element modeling may be used to determine these "optimal" distances d1, d2. However, the invention will also work with sub-optimal positions. Simulations have shown that such an optimal position may e.g. be obtained by "shifting" the resistive strips 8 about 25% over the membrane edge 21, and by "shifting" the resistive strip 9c entirely over the membrane edge 21, but other values for d1 and d2 would also work, as long as the first resistor R1 and the second resistor R2 is located "adjacent" the membrane edge 21, within a distance of at most 3 times (≤3×) the membrane thickness T, preferably less than 2.5 times T, e.g. less than 2.0 times T, and substantially near the middle of any side of the membrane 2.

Referring back to FIG. 5, it can thus be seen that the resistors R1 and R2 of the first pair are arranged "close" together (relative to the size of the membrane 2), and it can therefore be assumed (or approximated) that the temperatures of the piezo-resistive strips of R1 and R2 are substantially the same, say T1. Thus, by locating the strips 8, 9 of the resistors R1 and R2 "relatively close" together, more specifically such that the largest possible distance MD defined by the strips is only a fraction (e.g. less than 50%, preferably less than 20%) of a largest dimension W (length, width, diameter etc.) of the membrane 2, the temperature difference |T1−T2| between the resistors R1, R2 would also only be a fraction of the total temperature difference which may exist over the membrane 2. Hence, the sensitivity of the pressure sensor in respect of any temperature gradient over the membrane 2 is drastically reduced, and thus the accuracy of the pressure sensor is increased.

FIG. 12 is a schematic representation of radial stress (e.g. caused by external pressure) shown at four locations of a square membrane, which stress is typically caused by a pressure (to be measured) exerted on the membrane in a direction perpendicular to the substrate. It can then be understood that, when the orientation of the piezo-resistive strips 8, 9 of R1 and R2 are orthogonal to each other, the effect of such radial pressure exerted in a direction substantially perpendicular to the plane XY of the membrane 2 (in the Z-direction), will cause the value of R1 to increase (because the length of the piezo-strips increases), and the value of R2 to decrease (because their width increases), or vice versa.

FIG. 13 is a schematic representation of uniform (non-radial) stress (in the example shown from left to right) at four locations of a square membrane, which uniform non-radial stress may be caused by packaging. How would the circuit of FIG. 4 react to such stress? In the case illustrated in FIG. 13, the value of R1 would increase, and the value of R2 would decrease, hence the circuit of FIG. 4 cannot differentiate between external pressure and uniform non-radial package stress, which is a disadvantage of the first embodiment. (Of course, the corresponding zero-offset can still be reduced in other ways, e.g. by measuring the zero-offset during production, storing said value in flash, and subtracting the value during actual use of the device).

In summary, and referring back to FIG. 4, the behavior of Table 1 can now be understood for the individual resistors R1, R2, and for the pressure sensor 100, according to the first embodiment:

TABLE 1 behavior of first embodiment

| | R1 | R2 | pressure sensor 100 |
|---|---|---|---|
| external (radial) pressure varying temp T1 | up (down) R1 = f(T1) | down (up) R2 = f(T2), T2≈T1 | high sensitivity, good linear behavior insensitive (common mode) |
| Temp gradient | — | — | insensitive |
| uniform (non-radial) stress | up (down) | down (up) | sensitive (seen as "signal") |

FIG. 5 is already discussed above. The drawing shows an embodiment with a circular membrane, and with a square membrane in a single drawing. The behavior of both implementations is very similar. While the dual-resistor-layout of FIG. 9 (with two resistors, each having two piezo-resistive strips) was used in the pressure sensor 100 of FIG. 5, it shall be clear that the layout of FIG. 10 (with two resistors, each having three piezo-resistive strips) could also have been used.

FIG. 6 shows a schematic block-diagram of a second embodiment of a pressure sensor 200 according to the present invention. This is a variant of FIG. 4, and was already shortly discussed above. Everything which is mentioned above for the first embodiment 100 is also applicable for this embodiment, except that the position of the resistors R1, R2 and the current sources CS1, CS2 is swapped. Indeed, in FIG. 4 the current sources are connected with one end to ground whereas in FIG. 6 the current sources are connected with one end to the bias node A. Further, in FIG. 4 the resistors R1 and R2 are connected with one node to the bias node A whereas in FIG. 6 the resistors are connected with one node to ground.

The behavior and performance of the second embodiment 200 is very similar to that of the first embodiment 100, except for the capacitance of the resistors R1, R2, which is relevant for AC measurements and transient behavior. The thickness of the depletion layer between the resistors R1, R2 and the N-well in FIG. 6 is typically larger than that of FIG. 4, hence the embodiment of FIG. 6 may have a reduced bandwidth. Apart from this, the second embodiment offers the same advantages of high/improved sensitivity, good/improved linearity, insensitivity to temperature variations and temperature gradient, listed in TABLE 1. By the addition of a separate bias contact for the N-well the resistors R1, R2 can also be matched for the capacitance of the depletion layer.

Figure 7:
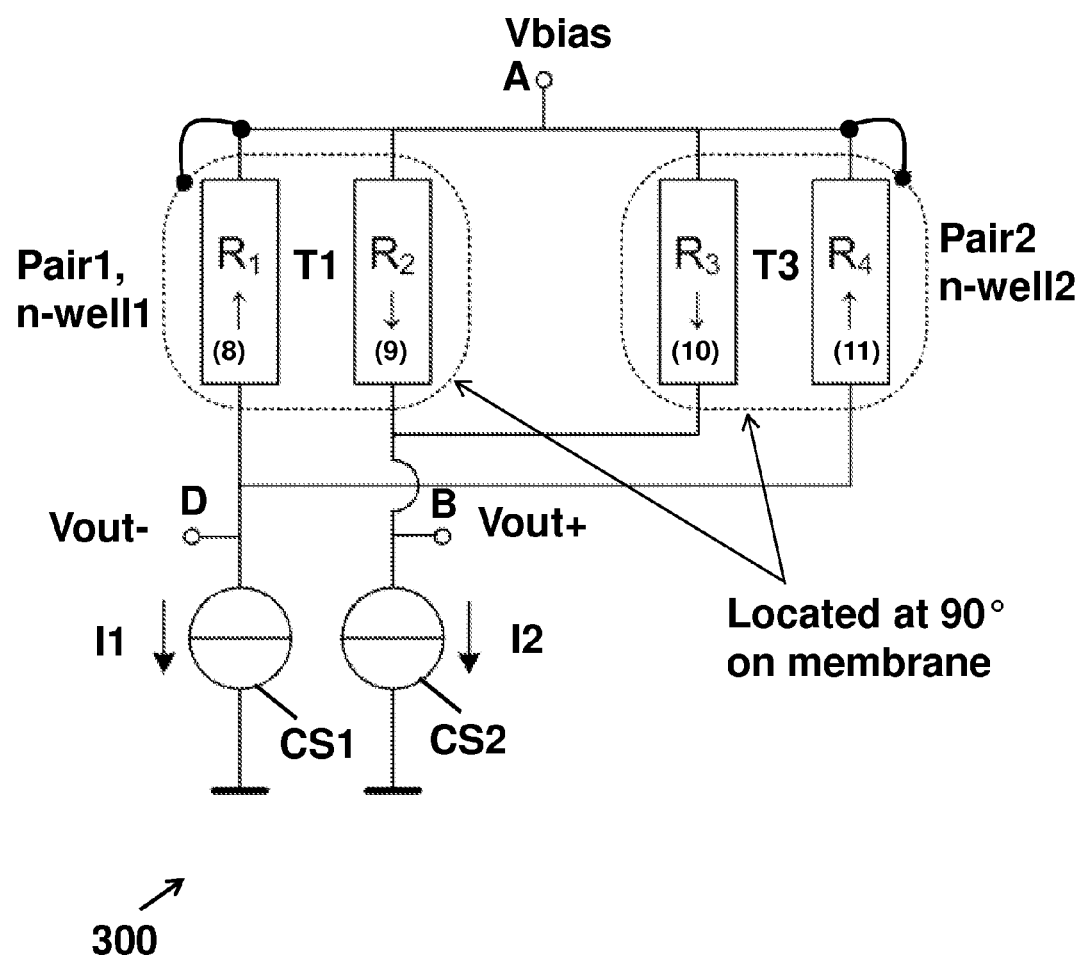
FIG. 7 shows a schematic block-diagram of a third (and preferred) embodiment of a pressure sensor according to the present invention.
Figure 8:
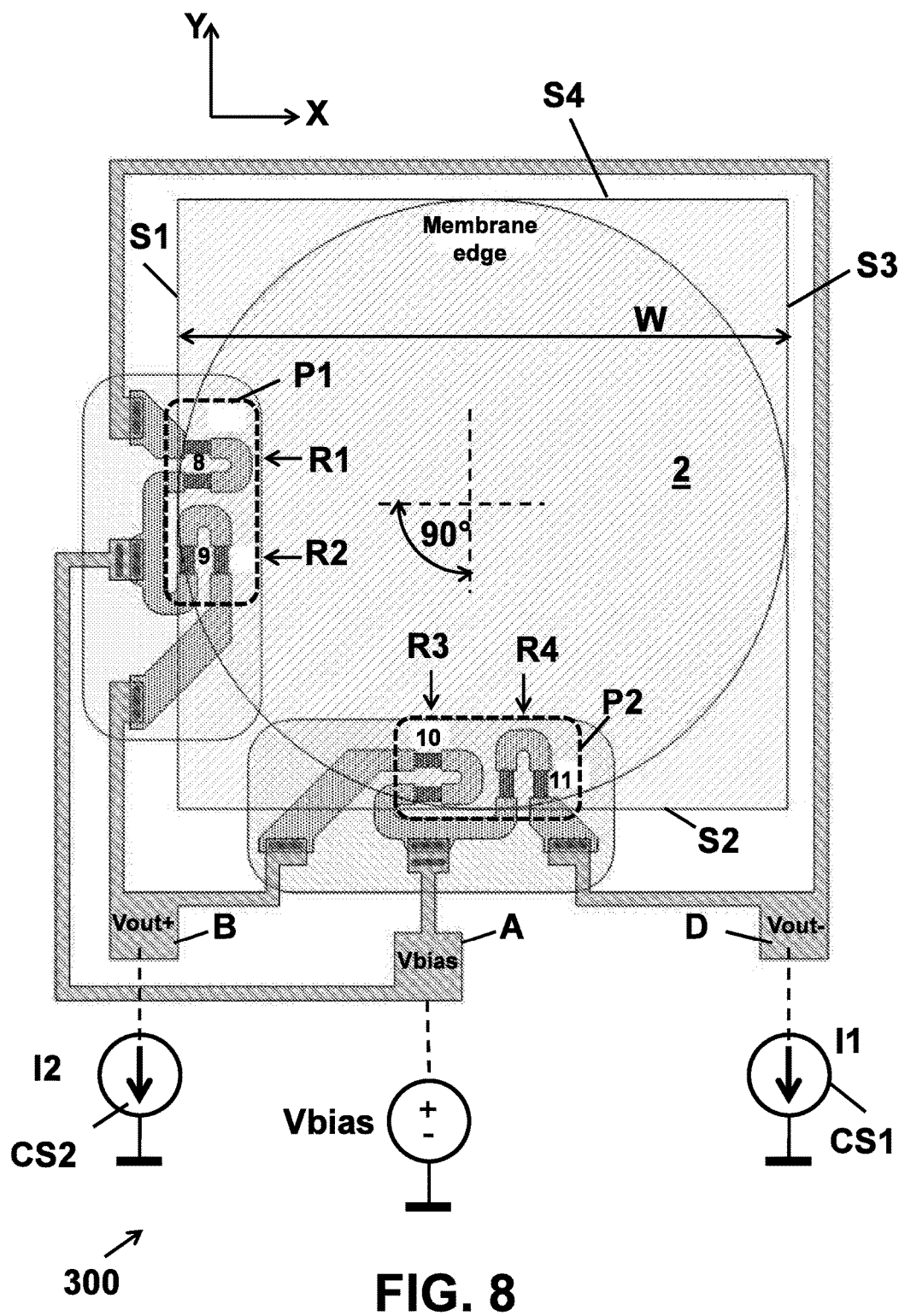
FIG. 8 shows an exemplary layout of (part of) the pressure sensor of FIG. 7.

FIG. 7 shows a schematic block-diagram of a third embodiment of a pressure sensor 300 according to the present invention, and FIG. 8 shows an example of a possible layout of part thereof. The pressure sensor 300 has all the components of the pressure sensor 100 of the first embodiment, and therefore, everything which is mentioned above for the first embodiment, is also applicable for this embodiment, unless specifically mentioned otherwise.

In addition, this embodiment further comprises: a second resistor pair P2 located on or adjacent to a second side portion S2 of the membrane 2. The second side portion S2 is located at 90° angular distance from the first side portion S1 as measured from a center of the membrane 2. The second resistor pair P2 comprises a third resistor R3 electrically connected in parallel with the second resistor R2 between said (first) bias node A and said second output node B, and a fourth resistor R4 connected in parallel with the first resistor R1 between said (first) bias node A and said first output node D. The third resistor R3 comprises one or more, e.g. two or three third elongated piezo-resistive strips 10 arranged in the first direction X. It is essential that this direction is the same direction as the piezo-resistive strips 8 of the first resistor R1 (as will be described further). The fourth resistor R4 comprises one or more second elongated piezo-resistive strips 11 arranged in the second direction Y.

It is noted in FIG. 7, that the "arrow up/down" in R1, R2, R3, R4 is a graphical indication meaning that if the resistance value of R1 increases due to the external pressure, then the value of R4 also increases, but the value of R2 and R3 decrease.

However, in order to fully appreciate the advantages of this circuit 300, the reader should also consider the layout structure of FIG. 8, and imagine what will happen in case of temperature variations over time, what will happen in case of a temperature gradient over the membrane (T1≈T2, and T3≈T4, but T1< >T3), what will happen in case external pressure is applied to the membrane (see the radial stress pattern of FIG. 12), and what will happen in case of uniform non-radial package-stress (see example of FIG. 13). This behavior is summarized in Table 2:

TABLE 2 behavior of third embodiment

| | R1 | R2 | R3 | R4 | pressure sensor 300 |
|---|---|---|---|---|---|
| external pressure (radial stress pattern) | up (down) | down (up) | down (up) | up (down) | high sensitivity, good linear behavior |
| varying temp T1 | R1 = f(T1) | R2 = f(T2), T2≈T1 | R3 = f(T3) | R4 = f(T4), | reduce or insensitive (common mode) |
| Temp gradient (T1<>T3) | T1 | T2≈T1 | T3 | T4≈T3 | reduced or insensitive [*1] |
| uniform (non-radial) stress | up (down) | down (up) | up (down) | down (up) | reduced or insensitive [*2] |

[*1]: The pressure sensor 300 is relatively insensitive to a temperature gradient over the membrane (i.e. T1 is not equal to T3), because R1 and R2 will both increase or decrease in the same manner, and R3 and R4 will both increase or decrease in the same manner, hence the parallel-connection of R1 and R4 will also increase or decrease in substantially the same manner as the parallel connection of R2 and R3 (not exactly, but the same in first order approximation). The closer the strips 8, 9 of R1 and R2 on the one hand, and the piezo-resistive strips 10, 11 of R3 and R4 on the other hand are located together, the less the temperature difference between R1 and R2, and the less the temperature difference between R3 and R4. Even though this compensation may not be perfect, it is clear that this effect is not present at all when the piezo-resistive strips are located on four different sides of the membrane. Hence, locating the resistors R1 and R2 near a first side, and R3 and R4 near a second side, offers a clear advantage over the prior art.

[*2] The pressure sensor 300 is relatively insensitive to uniform (non-radial) stress, e.g. package stress, because R1 and R4 have opposite behavior (due to the orientation and location of their piezo-resistive strips): if R1 increases due to uniform stress (see FIG. 13), then R4 will decrease because the strips of R1 and R4 are perpendicular to each other). Likewise, R2 and R3 have opposite behavior for uniform non-radial stress (see FIG. 13). And since R1 and R4 are connected in parallel, and R2 and R3 are connected in parallel, the combined effect is drastically reduced, or even eliminated (in first order). In other words: a uniform (non-radial) stress, e.g. due to package stress, exerted on the device 300 will not significantly change the output voltage ΔVout, although a small common mode shift of the voltages Vout−, Vout+ at the output nodes D, B can be observed when the ratio of the transversal and longitudinal coefficients is not exactly minus one.

Comparison of Table 2 and Table 1 shows that the main advantage of a pressure sensor 300 according to the third embodiment is that it has the additional advantage of being relatively insensitive to uniform (non-radial) stress, e.g. package stress.

FIG. 8 will not be described in detail, because it is very similar to FIG. 5. The reader will understand that, even though the resistors R1,R2,R3,R4 are shown with only piezo-resistive strips (using the layout of FIG. 9), it is of course also possible to a resistor-layout with three piezo-strips (using the layout of FIG. 10). It is preferably if the same layout pattern (apart from shifting, rotating and mirroring) is used for the first resistor pair P1 and for the second resistor pair P2, but that is not absolutely required, and the invention will also work if for example the first resistor pair P1 would use the layout of FIG. 9, and the second resistor pair P2 would use the layout of FIG. 10, or vice versa, provided that the relative orientations and resistance value R1=R2=R3=R4 is maintained. However, using a single layout-pattern would result in better matching, hence a higher accuracy is to be expected. The sensitivity of a resistor is influenced by the layout and therefore the same layout of the piezoresistive strips is preferred.

FIG. 9 is already described above. However, when used in the second embodiment 200 (FIG. 6), a modification needs to be made, because Vbias would be actually Ground, and the N-well would be connected to Vdd, not to ground. Thus, the "n-contact" would have to be provided via a fourth contact, rather than via the contact of Vbias. The same applies for FIG. 10, when used in the second embodiment 200.

This reflects another advantage of the layout-structure of FIG. 9 and FIG. 10. When the current sources are not integrated on the sensor chip, the resistor-layout of FIG. 9 and FIG. 10 only requires 3 bondpads, whereas a Wheatstone-bridge always requires 4 bondpads: one for VDD, one for GND, and two for the output signal.

FIG. 11 to FIG. 13 were already discussed above.

Figure 14:
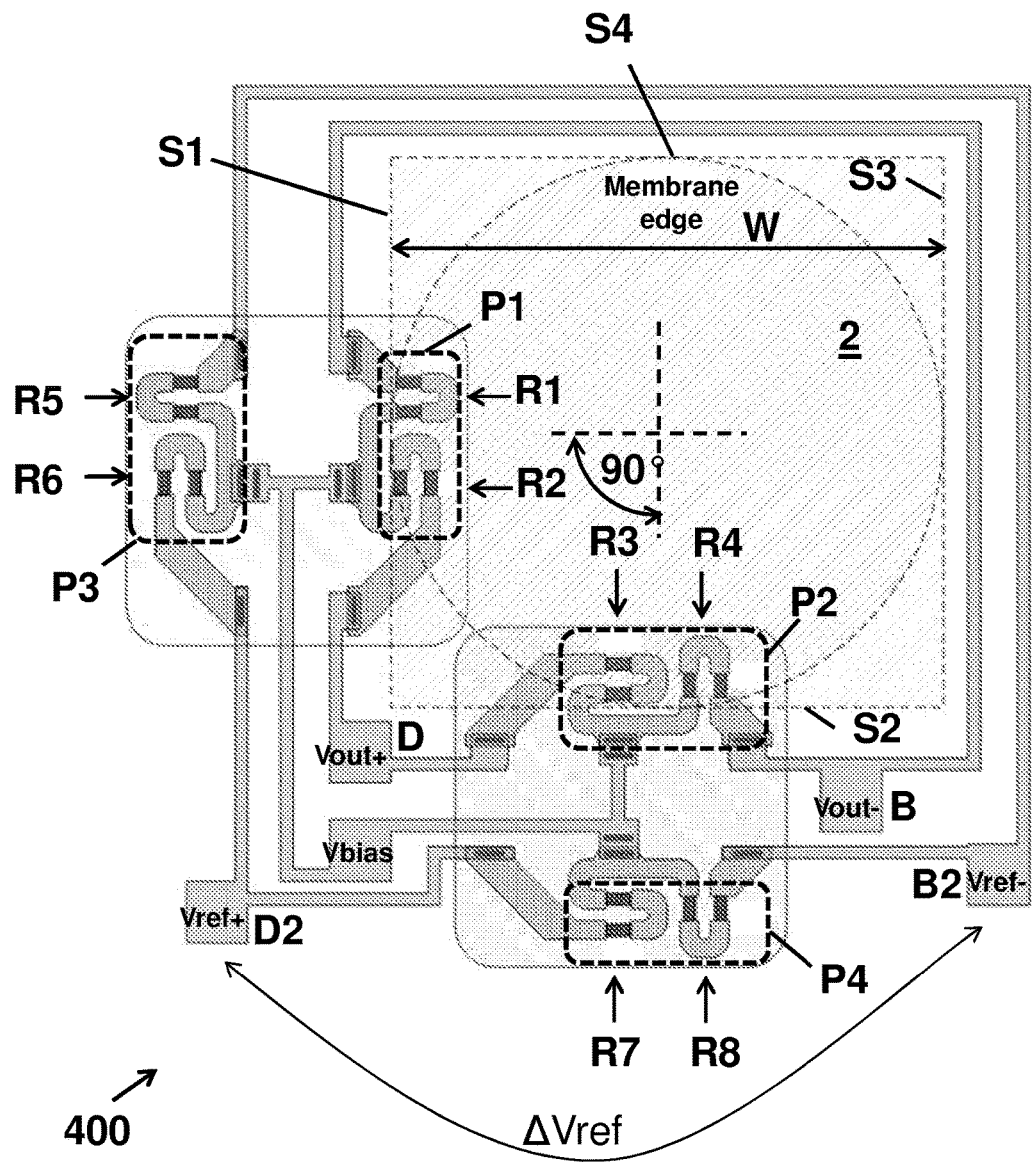
FIG. 14 illustrates a fourth embodiment of a pressure sensor according to the present invention.

FIG. 14 illustrates a fourth embodiment of a pressure sensor 400 according to the present invention. A pressure sensor 400 according to the fourth embodiment has all the features of a pressure sensor according to the third embodiment. In order to describe the fourth embodiment, the circuit shown in FIG. 7 will be referred to as "first sub-circuit". A pressure sensor according to the fourth embodiment would then have also a "second sub-circuit", electrically identical to the first sub-circuit shown in FIG. 7, but comprising a third and fourth resistor pair P3, P4 (instead of P1, P2) and with a third and fourth current source CS3, CS4 (instead of CS1, CS2).

The second sub-circuit comprising P3, P4, CS3, CS4 is preferably biased by the same bias voltage Vbias and ground Gnd as the first sub-circuit, although that is not absolutely required. The second sub-circuit provides a second differential output signal ΔVref. The third pair P3 comprises two resistors R5, R6 (corresponding to R1 and R2 of the first sub-circuit) and the fourth pair P4 comprises two resistors R7, R8 (corresponding to R3 and R4 of the first sub-circuit). The resistors R5, R6, R7, R8 are located adjacent to and substantially in the middle of the first and second side S1, S2 of the membrane 2, outside the membrane 2, on the bulk material. They are not intended for measuring deflections of the membrane 2, but for measuring only (radial) strain due to packaging.

By using the same or similar layout pattern (or rotated, translated, mirrored) as shown in FIG. 9 or FIG. 10, the piezo-resistive strips of R5 and R6 are located "closely together" relative to the membrane size (using the same formula MD/W), and hence the temperature of the fifth and sixth resistors R5, R6 can be considered to be substantially the same, say T5. Likewise the temperature of the seventh and eighth resistor R7, R8 can be considered substantially the same. Thus by organizing the resistors of the second (outer) sub-circuit in pairs P3, P4 (rather than as individual resistors spread around the membrane 2, as is done in the prior art), also the second sub-circuit is substantially insensitive, e.g. insensitive to a temperature gradient, which is a major advantage over the prior art, when using the output ΔVref of the second sub-circuit comprising P3, P4 to correct the output ΔVout of the first sub-circuit comprising P1, P2.

Because the thickness T of the membrane 2, typically in the order of 10 to 100 micrometer is usually much smaller, e.g. at least ten times smaller than the size of the membrane (e.g. a membrane width in the range of 200 to 2000 micrometer), the third resistor pair P3 is located relatively "close" to the first resistor pair P1, and the fourth resistor pair P4 is located relatively "close" to the second resistor pair P2, such that the pressure sensed by the third resistor pair P3 due to the packaging is substantially the same as the pressure exerted by the package on the first resistor pair P1, and the pressure sensed by the fourth resistor pair P4 due to the packaging is substantially the same as the pressure exerted by the package on the second resistor pair P2.

Thus the value measured by the first (inner) sub-circuit is indicative for the external pressure and package stress, while the value measured by the second sub-circuit is indicative for the package stress only. If an identical layout is chosen for the resistors R1-R4 and for R5-R8 of the first and second sub-circuit, and if the same bias voltage Vbias is chosen for the first and second sub-circuit (in FIG. 14 they are hard-wired), the value of the second sub-circuit can be subtracted from the value of the first sub-circuit to compensate for package stress, in ways known in the art (for example by a digital controller, after ADC). But the invention is not limited thereto, and in general, the value of the second sub-circuit would be proportional to the package stress, and a predefined fraction of the value ΔVref can be subtracted in another manner (e.g. in an analog manner) from the output ΔVout of the first sub-circuit to compensate the zero-offset against package stress.

Although the use of a second sub-circuit in an attempt to compensate for offset error due to package stress is already mentioned in the prior art (see EP0083496A2), experiments have shown that the offset compensation disclosed in the prior art (where individual resistors are distributed over the four sides of the membrane and the bulk), does not work very well, and is quite sensitive to a temperature gradient.

It was found that, when the resistors of the two sub-circuits are organized in pairs P1,P2 and P3,P4, as described in the present invention, and as shown for example in FIG. 14, the matching between the first (inner) sub-circuit measuring the pressure of the membrane and the second (outer) sub-circuit measuring only the package stress is at least 3.0 times than that of the prior art. Thus while the prior art has "a" provision for compensating package stress, the accuracy of that provision is not very high, and the accuracy provided by the present invention is a factor of at least 3.0 times higher. This is a major improvement over the prior art.

It is believed that one of the underlying reasons why the matching of the sub-circuits organised in pairs as described herein is significantly better than the matching of the prior art sub-circuits, is mainly related to the fact that the distance between the piezo-resistive strips within the pairs is much shorter than the distance between piezo resistive strips of the classical sub-circuits, however, the inventors do not wish to be bound by any theory.

By locating the third pair P3 "close" to the first pair P1, automatically also the temperature of the resistors R1, R2, R5 and R6 will be substantially the same (thus T1=T2=T5=T6), although that is not absolutely required, it suffices that T1=T2 and that T5=T6. As mentioned above, the main reason for locating the third pair P3 close to the first pair P1 is to match the package stress as good as possible. Since the resistors R1 to R4 are located on the membrane 2, (or more correctly stated: a major portion of R1 and R4 is located on the membrane) they are sensitive to pressure exerted on the membrane 2 as well as to pressure exerted by the package. In contrast, since the resistors R5 to R8 are located "sufficiently far" outside the membrane 2, e.g. at least 4.0 times (≥4×) the membrane thickness T away from the membrane edge 21, or at least 6.0 times, or at least 10.0 times, they are only sensitive to the pressure exerted by the package. Hence, the second sub-circuit comprising the resistors R5 to R8 can be used to determine the radial pressure exerted by the package on the substrate, which radial pressure can be used to compensate the pressure value obtained from the first sub-circuit, using known methods.

In practice, a trade-off needs to be made with respect to the position of the third and fourth resistor pair P3, P4 in relation to the first resp. second resistor pairs P1, P2: if P3 is located "too close" to the membrane edge (and thus to P1), it provides a better indication (higher correlation) of the package pressure exerted upon the resistors of P1 and P2, but P3 will also be more sensitive to the external pressure on the membrane. If P3 is "too far" from the membrane edge, it will be substantially insensitive to the external pressure to be measured by the first sub-circuit, but the package stress experienced by P3 may deviate more from the package stress experienced by P1 (lower correlation). As a rule of thumb, the third and fourth resistor pairs P3, P4 may e.g. be located at a distance equal to about 4.0 times (4×) to about 10.0 times (10×) the membrane thickness T.

From the above it can be understood that a pressure sensor 400 according to the third embodiment has all advantages of a pressure sensor according to the third embodiment (listed in TABLE 2), and in addition has an improved accuracy because it has an improved compensation of (radial) package stress.

In a second aspect, the present invention also relates to a semiconductor device comprising a pressure sensor 100, 200, 300, 400 as described above.

Figure 15:
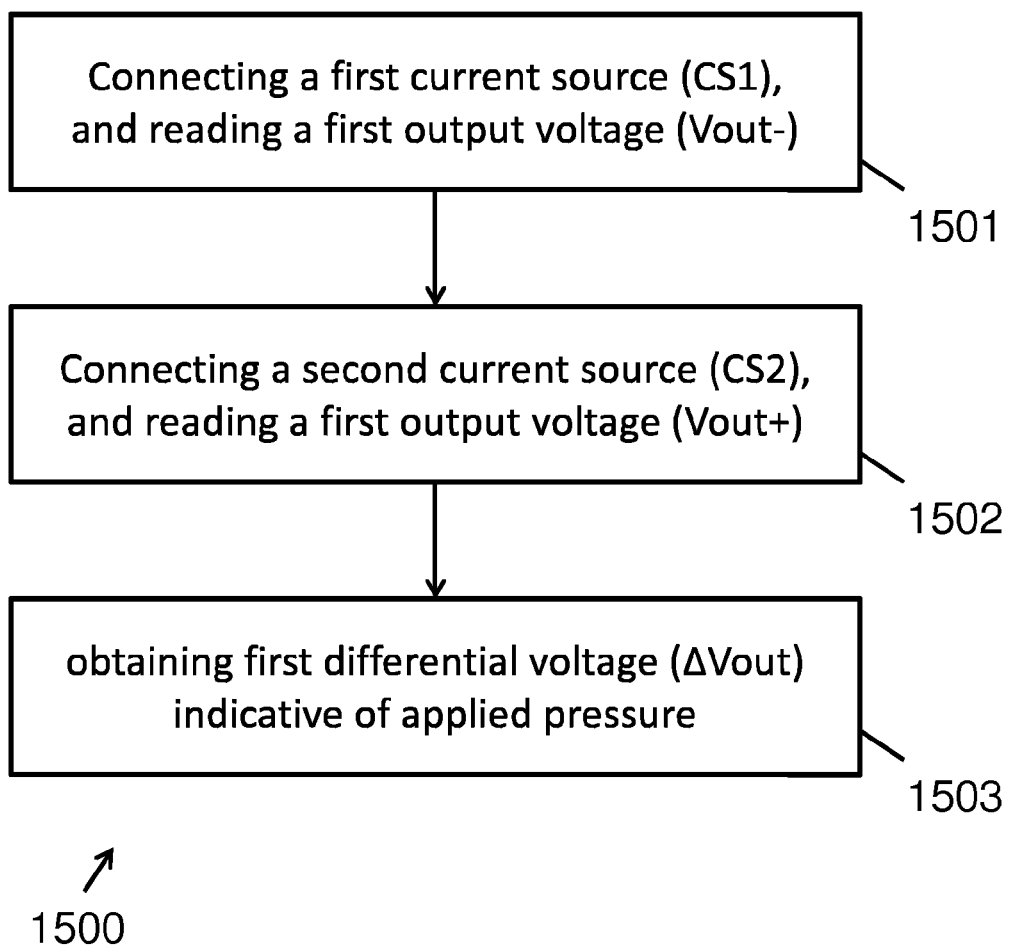
FIG. 15 illustrates a method according to the present invention.

Referring to FIG. 15, in a third aspect, the present invention relates to a method 1500 of determining an external pressure exerted on a semiconductor substrate, where the semiconductor substrate comprises a membrane 2 and a resistor structure having one resistor pair P1 arranged as described above (first embodiment or second embodiment and shown in FIG. 4 to FIG. 6), whereby the method comprises the steps of: applying 1501 a first predefined current I1 to said first resistor R1 by connecting a first current source CS1; applying 1502 a second predefined current I2 to said second resistor R2 by connecting a second current source CS2; obtaining 1503 a first differential voltage signal ΔVout over the first and second output node B, D.

It is noted that the current sources CS1 and CS2 may, or may not be part of the same substrate as the one where the membrane is located, but could be located on a second substrate (not shown), connectable to the first substrate via for example three or four bondpads.

The present invention also relates to a method of determining an external pressure exerted on a semiconductor substrate having a membrane 2 and two resistor pairs P1, P2 arranged as described above (third embodiment, and shown in FIG. 7 and FIG. 8). This method comprises the steps of: applying a first predefined current I1 to said parallel connection of the first resistor R1 and fourth resistor R4 using a first current source CS1; applying a second predefined current I2 to said parallel connection of the second resistor R2 and third resistor R3 using a second current source CS2; and measuring a first differential voltage signal ΔVout over the first and second output node B, D.

The present invention also relates to a method of determining an external pressure exerted on a semiconductor substrate having a membrane 2 and two resistor pairs P1, P2 arranged as described above (fourth embodiment, and shown in FIG. 14). This method comprises the steps of: applying a first predefined current I1 to said parallel connection of the first resistor R1 and fourth resistor R4 using a first current source CS1; applying a second predefined current I2 to said parallel connection of the second resistor R2 and third resistor R3 using a second current source CS2; and measuring a first differential voltage signal ΔVout over the first and second output node B, D; and applying a third predefined current I3 to said parallel connection of R5 and R8 using a third current source CS3; applying a fourth predefined current I4 to said parallel connection of R6 and R7 using a fourth current source CS4; and measuring a second differential voltage signal ΔVref over the third and fourth output node B2, D2; and correcting a value corresponding to the first differential voltage signal ΔVout with a value corresponding to the second differential voltage signal ΔVref.

REFERENCES

100, 200, 300, 400 pressure sensor
21 membrane edge
3 corner parts
4 metal electrode
6 electrode lead-out regions
MD largest distance
8,9,10,11 piezo-resistive strip of first,second,third,fourth resistor
P1, P2, . . . first, second, . . . resistor pair
R1, R2, . . . first, second resistor
S1, S2, . . . first, second side of square membrane
T membrane thickness
W width of the square membrane
Vdd supply voltage
Gnd ground voltage
Vbias biasing voltage

The invention claimed is:

1. A semiconductor pressure sensor for determining an external pressure exerted on the sensor, comprising:

a membrane as part of a semiconductor substrate for being deformed due to the external pressure, having a membrane edge and a membrane thickness;

a first resistor pair located on or adjacent to a first side portion of the membrane, the first resistor pair comprising a first resistor connected between a first bias node and a first output node, and a second resistor connected between said first bias node and a second output node different from the first output node, a resistance of the second resistor being equal to a resistance of the first resistor;

a first current source connected or connectable to the first output node and adapted for causing a first predefined current to flow through the first resistor so that the first output node assumes a first output voltage;

a second current source connected or connectable to the second output node and adapted for causing a second predefined current to flow through the second resistor so that the second output node assumes a second output voltage, wherein the second predefined current is substantially equal to the first predefined current;

the first resistor comprising one or more first elongated piezo-resistive strips arranged in a first direction for measuring deformation of the membrane due to the external pressure to be measured, the second resistor comprising one or more second elongated piezo-resistive strips arranged in a second direction for measuring deformation of the membrane due to the external pressure to be measured, wherein the second direction is substantially perpendicular to the first direction;

the first and second output voltage forming a first differential voltage signal indicative of the external pressure to be measured;

wherein the first and the second elongated piezo-resistive strips are formed as p doped regions within an n-well; and wherein the first bias node is electrically connected to the n-well.

2. The semiconductor pressure sensor according to claim 1, further comprising: a first readout circuit comprising a first differential amplifier for converting the first differential voltage signal into a first pressure signal indicative of the pressure to be measured.

3. The semiconductor pressure sensor according to claim 1, further comprising:

a second resistor pair located on or adjacent to a second side portion of the membrane, wherein the second side portion is located substantially or precisely at 90° angular distance from the first side portion as measured from a center of the membrane;

the second resistor pair comprising a third resistor connected in parallel with the second resistor between said first bias node and said second output node, and a fourth resistor connected in parallel with the first resistor between said first bias node and said first output node;

the third resistor comprising one or more third elongated piezo-resistive strips arranged in the first direction, the fourth resistor comprising one or more fourth elongated piezo-resistive strips arranged in the second direction.

4. The semiconductor pressure sensor according to claim 1, further comprising:

a third resistor pair arranged at the first side portion of the membrane but outside of the membrane, the third resistor pair comprising a fifth resistor connected between said first bias node and a third output node, and a sixth resistor connected between said first bias node and a fourth output node different from the third output node;
a third current source connected to the third output node and adapted for causing a third predefined current to flow through the fifth resistor so that the third output node provides a third output voltage;
a fourth current source connected to the fourth output node and adapted for causing a fourth predefined current to flow through the sixth resistor so that the fourth output node provides a fourth output voltage, wherein the third and fourth predefined current is substantially equal to the first predefined current;
the fifth resistor comprising one or more fifth elongated piezo-resistive strips arranged in the first direction, and the sixth resistor comprising one or more sixth elongated piezo-resistive strips arranged in the second direction for measuring packaging stress;
and a fourth resistor pair arranged at the second side portion of the membrane but outside of the membrane, the fourth resistor pair comprising a seventh resistor connected in parallel with the sixth resistor between said first bias node and said fourth output node, and an eighth resistor connected in parallel with the fifth resistor between said first bias node and said third output node, the seventh resistor comprising one or more seventh elongated piezo-resistive strips arranged in the first direction, the eighth resistor comprising one or more eighth elongated piezo-resistive strips arranged in the second direction;
wherein the one or more piezo-resistive strips of the fifth and sixth and seventh and eighth resistor are arranged at a distance from the membrane edge of at least 4.0 times the membrane thickness for only measuring stress exerted by packaging on the semiconductor substrate;
the third and fourth output voltage forming a second differential voltage signal indicative of the package stress.

5. The semiconductor pressure sensor according to claim 4, further comprising:
a multiplexer for selectively applying the first differential voltage signal and the second differential voltage signal to the first differential amplifier; and/or
a second readout circuit comprising a second differential amplifier for converting the second differential voltage signal into a second pressure signal indicative of the package stress.

6. The semiconductor pressure sensor according to claim 1, wherein each of the resistors comprises at least two or at least three elongated piezo-resistive strips connected in series.

7. The semiconductor pressure sensor according to claim 6, wherein a layout of each resistor pair further comprises a first and second leadout region for electrical interconnection to the output nodes and a third leadout region for electrical interconnection to the first bias node, wherein the third leadout region is located between the first and second leadout region.

8. The semiconductor pressure sensor according to claim 1, wherein each of the resistors comprises an equal number of elongated piezo-resistive strips, and wherein the dimensions of all elongated piezo-resistive strips is identical.

9. The semiconductor pressure sensor according to claim 1,
wherein the substrate is a CMOS wafer; and
wherein the membrane is located in a (100) plane of the CMOS substrate, and at least one of the elongated piezo-resistive strips is oriented in a <110> direction of the CMOS substrate.

10. The semiconductor pressure sensor according to claim 9, wherein the membrane has a square or circular shape.

11. The semiconductor pressure sensor according to claim 1, wherein the semiconductor pressure sensor is incorporated in a semiconductor device.

12. The semiconductor pressure sensor according to claim 1, wherein the one or more elongated piezo-resistive strips have a length in a range of 6 µm to 60 µm, and a ratio of the length of the one or more elongated piezo-resistive strips and a width of the membrane is in a range of 1/50 to 1/10.

13. The semiconductor pressure sensor according to claim 1, wherein the first current source and the second current source have an output impedance of at least 20 times a resistance of the first resistor pair and the second resistor pair.

14. A method of determining an external pressure exerted on a semiconductor substrate, the semiconductor substrate comprising:
a membrane arranged for being deformed due to the external pressure, and having a membrane edge and a membrane thickness;
a first resistor pair located on or adjacent to a first side portion of the membrane, the first resistor pair comprising a first resistor connected between a first bias node and a first output node, and a second resistor connected between said first bias node and a second output node different from the first output node, a resistance of the second resistor being equal to a resistance of the first resistor;
the first resistor comprising one or more first elongated piezo-resistive strips arranged in a first direction for measuring deformation of the membrane due to the external pressure to be measured, the second resistor comprising one or more second elongated piezo-resistive strips arranged in a second direction for measuring deformation of the membrane due to the external pressure to be measured, wherein the second direction is substantially perpendicular to the first direction;
wherein the first and the second piezo-resistive strips are formed as p doped regions within an n-well; and
wherein the first bias node is electrically connected to the n-well;
the method comprising the steps of:
connecting a first current source to the first output node, the first current source being adapted for causing a first predefined current to flow through the first resistor so that the first output node assumes a first output voltage;
connecting a second current source to the second output node, the second current source being adapted for causing a second predefined current to flow through the second resistor so that the second output node assumes a second output voltage, wherein the second predefined current is substantially equal to the first predefined current;
obtaining a first differential voltage signal over the first and second output node as an indication of the external pressure to be measured.

15. The method according to claim 14, wherein the substrate further comprises a second resistor pair located on or adjacent to a second side portion of the membrane, wherein the second side portion is located substantially or precisely at 90° angular distance from the first side portion as measured from a center of the membrane;

the second resistor pair comprising a third resistor connected in parallel with the second resistor between said first bias node and said second output node, and a fourth resistor connected in parallel with the first resistor between said first bias node and said first output node;

the third resistor comprising one or more third elongated piezo-resistive strips arranged in the first direction, the fourth resistor comprising one or more fourth elongated piezo-resistive strips arranged in the second direction.

16. The method according to claim 15, wherein the substrate further comprises:

a third resistor pair arranged at the first side portion of the membrane but outside of the membrane, the third resistor pair comprising a fifth resistor connected between said first bias node and a third output node, and a sixth resistor connected between said first bias node and a fourth output node different from the third output node;

a third current source connected to the third output node and adapted for causing a third predefined current to flow through the fifth resistor so that the third output node provides a third output voltage;

a fourth current source connected to the fourth output node and adapted for causing a fourth predefined current to flow through the sixth resistor so that the fourth output node provides a fourth output voltage, wherein the third and fourth predefined current is substantially equal to the first predefined current;

the fifth resistor comprising one or more fifth elongated piezo-resistive strips arranged in the first direction, and the sixth resistor comprising one or more sixth elongated piezo-resistive strips arranged in the second direction for measuring packaging stress;

and a fourth resistor pair arranged at the second side portion of the membrane but outside of the membrane, the fourth resistor pair comprising a seventh resistor connected in parallel with the sixth resistor between said first bias node and said fourth output node, and an eighth resistor connected in parallel with the fifth resistor between said first bias node and said third output node, the seventh resistor comprising one or more seventh elongated piezo-resistive strips arranged in the first direction, the eighth resistor comprising one or more eighth elongated piezo-resistive strips arranged in the second direction;

wherein the one or more piezo-resistive strips of the fifth and sixth and seventh and eighth resistor are arranged at a distance from the membrane edge of at least 4.0 times the membrane thickness for only measuring stress exerted by packaging on the semiconductor substrate;

the third and fourth output voltage forming a second differential voltage signal indicative of the package stress;

the method further comprising the step of:

applying a third predefined current to said parallel connection of the fifth resistor and the eighth resistor using a third current source; and applying a fourth predefined current to said parallel connection of the sixth resistor and the seventh resistor using a fourth current source; and measuring a second differential voltage signal over the third and fourth output node; and correcting a value corresponding to the first differential voltage signal with a value corresponding to the second differential voltage signal.

17. A semiconductor pressure sensor for determining an external pressure exerted on the sensor, comprising:

a membrane as part of a semiconductor substrate for being deformed due to the external pressure, having a membrane edge and a membrane thickness;

a first resistor pair located on or adjacent to a first side portion of the membrane, the first resistor pair comprising a first resistor connected between a first bias node and a first output node, and a second resistor connected between said first bias node and a second output node different from the first output node, a resistance of the second resistor being equal to a resistance of the first resistor;

a first current source connected or connectable to the first output node and adapted for causing a first predefined current to flow through the first resistor so that the first output node assumes a first output voltage;

a second current source connected or connectable to the second output node and adapted for causing a second predefined current to flow through the second resistor so that the second output node assumes a second output voltage, wherein the second predefined current is substantially equal to the first predefined current;

the first resistor comprising one or more first elongated piezo-resistive strips arranged in a first direction for measuring deformation of the membrane due to the external pressure to be measured, the second resistor comprising one or more second elongated piezo-resistive strips arranged in a second direction for measuring deformation of the membrane due to the external pressure to be measured, wherein the second direction is substantially perpendicular to the first direction;

a second resistor pair located on or adjacent to a second side portion of the membrane, wherein the second side portion is located substantially or precisely at 90° angular distance from the first side portion as measured from a center of the membrane;

the second resistor pair comprising a third resistor connected in parallel with the second resistor between said first bias node and said second output node, and a fourth resistor connected in parallel with the first resistor between said first bias node and said first output node;

the third resistor comprising one or more elongated third piezo-resistive strips arranged in the first direction, the fourth resistor comprising one or more fourth elongated piezo-resistive strips arranged in the second direction;

the first and second output voltage forming a first differential voltage signal indicative of the external pressure to be measured.

* * * * *